United States Patent
Nagata et al.

(10) Patent No.: US 11,338,756 B2
(45) Date of Patent: May 24, 2022

(54) AIRBAG DEVICE WITH HORN SWITCH BODY

(71) Applicant: TOYODA GOSEI CO., LTD., Kiyosu (JP)

(72) Inventors: Matsuo Nagata, Kiyosu (JP); Koji Sakurai, Kiyosu (JP); Hirotoshi Kanzaki, Kiyosu (JP); Kenji Sumita, Tokyo (JP); Hiroki Sakamoto, Kiyosu (JP); Yuki Nonoyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 37 days.

(21) Appl. No.: 16/824,878

(22) Filed: Mar. 20, 2020

(65) Prior Publication Data

US 2020/0307493 A1 Oct. 1, 2020

(30) Foreign Application Priority Data

Mar. 29, 2019 (JP) .............................. JP2019-065997
Nov. 29, 2019 (JP) .............................. JP2019-217034

(51) Int. Cl.
*B60R 21/203* (2006.01)
*B60Q 5/00* (2006.01)
*B60R 21/237* (2006.01)

(52) U.S. Cl.
CPC .......... *B60R 21/2037* (2013.01); *B60Q 5/003* (2013.01); *B60R 21/203* (2013.01); *B60R 21/237* (2013.01)

(58) Field of Classification Search
CPC ........................... B60R 21/203; B60R 21/2037
See application file for complete search history.

(56) References Cited

U.S. PATENT DOCUMENTS 4,785,144 A * 11/1988 Fosnaugh .............. B60Q 5/003
                                                              200/61.55
5,350,190 A *  9/1994 Szigethy ................ B60Q 5/003
                                                              200/61.55
(Continued)

FOREIGN PATENT DOCUMENTS

JP 2011-106652 A 6/2011
JP 2016-084005 A 5/2016

OTHER PUBLICATIONS

Office Action dated Mar. 23, 2022 in connection with counterpart Chinese Patent Application No. 202010236360.7 (and English machine translation).

*Primary Examiner* — Barry Gooden, Jr.
(74) *Attorney, Agent, or Firm* — Posz Law Group, PLC

(57) ABSTRACT

An airbag device with a horn switch body, configured so as to be installed in an upper surface side in a boss portion near a center of a steering wheel, includes: an airbag which inflates by receiving inflation gas; an inflator for supplying inflation gas to the airbag; a pad covering the folded airbag; a mounting base made of sheet metal which holds the airbag, the inflator, and the pad; a horn switch body having an assembling pin to be assembled to a main body side of the steering wheel; and a support plate made of a sheet metal which supports the horn switch body as a configuration attached to a lower surface side of the mounting base. A case around the assembling pin, the mounting base, or the support plate is provided with a spacer capable of preventing rattling of the switch disposition portion in the case.

6 Claims, 15 Drawing Sheets

(56) References Cited

U.S. PATENT DOCUMENTS

| | | | |
|---|---|---|---|
| 6,554,312 B2* | 4/2003 | Sakane | B60Q 5/003 |
| | | | 280/728.2 |
| RE47,687 E * | 11/2019 | Umemura | B60R 21/2037 |
| 2010/0066066 A1* | 3/2010 | Sakurai | B60R 21/2037 |
| | | | 280/731 |
| 2013/0239739 A1* | 9/2013 | Miyahara | B60R 21/2037 |
| | | | 74/552 |
| 2015/0042079 A1* | 2/2015 | Ishii | B60Q 5/003 |
| | | | 280/728.2 |
| 2016/0114752 A1 | 4/2016 | Banno | |
| 2017/0136978 A1 | 5/2017 | Banno | |
| 2018/0029556 A1* | 2/2018 | Ishii | B60R 21/2037 |
| 2019/0225178 A1* | 7/2019 | Kolosick | B60R 21/203 |
| 2020/0043679 A1* | 2/2020 | Nonoyama | B60R 21/2037 |
| 2020/0346606 A1* | 11/2020 | Hirota | B60R 21/21656 |
| 2021/0031684 A1* | 2/2021 | Matsuo | B60Q 5/003 |
| 2021/0229618 A1* | 7/2021 | Schutz | B60R 21/2035 |
| 2021/0269080 A1* | 9/2021 | Kim | B62D 7/222 |

* cited by examiner

FIG.8
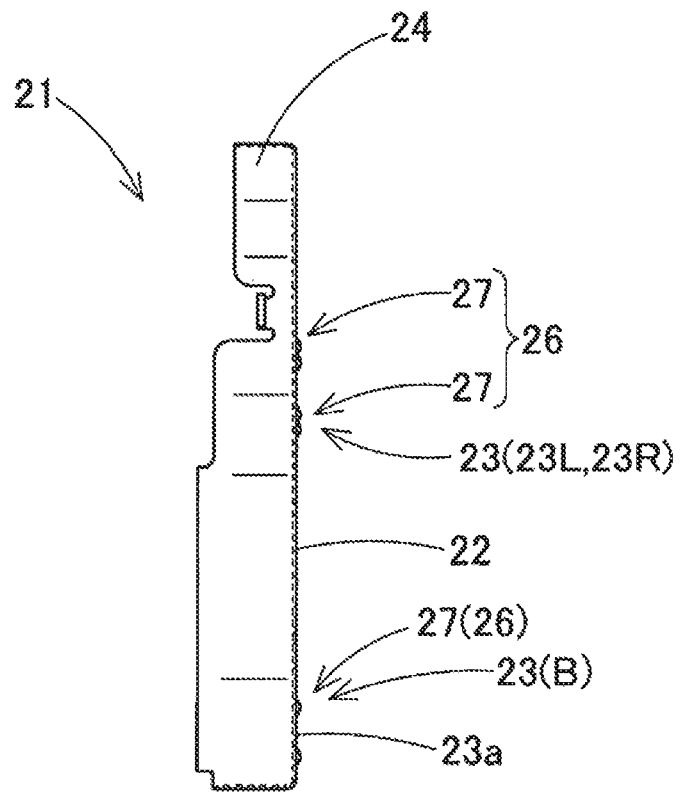
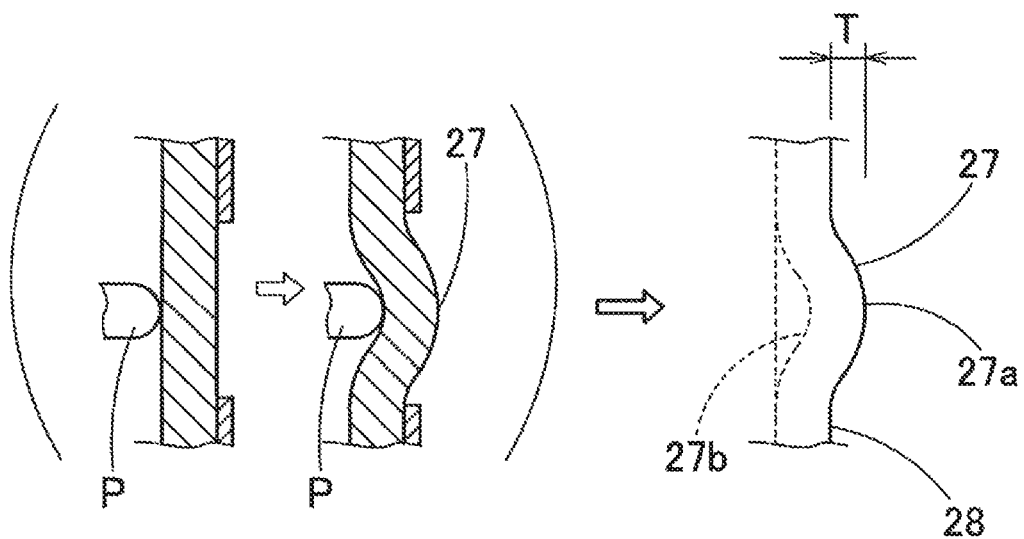

FIG.9
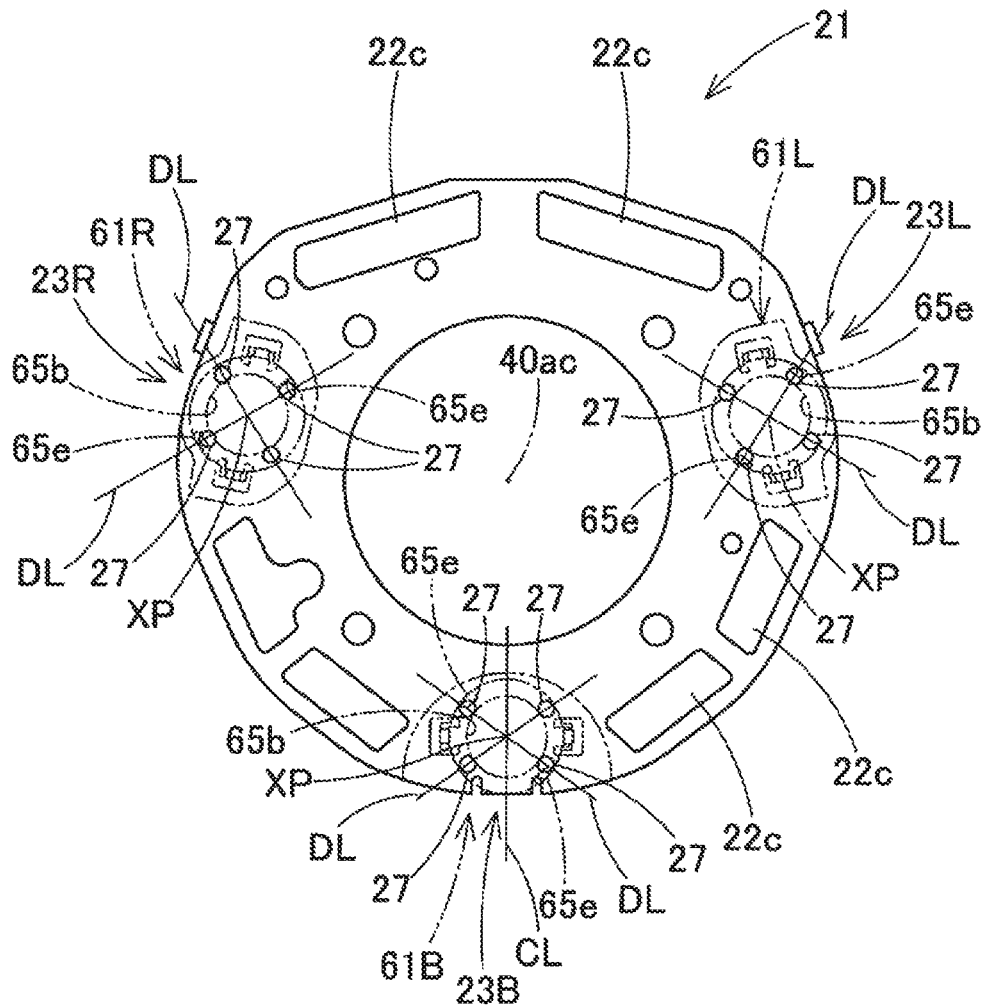
MODIFICATION EXAMPLE
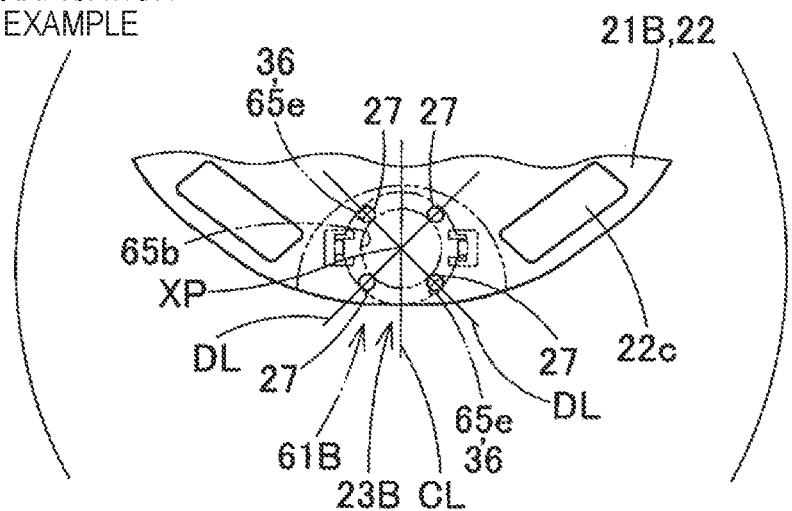

AIRBAG DEVICE WITH HORN SWITCH BODY

CROSS-REFERENCE TO RELATED APPLICATION(S)

This application is based upon and claims the benefit of priority from prior Japanese patent application No. 2019-065997 filed on Mar. 29, 2019, and Japanese patent application No. 2019-217034 filed on Nov. 29, 2019, the entire contents of which are incorporated herein by reference.

BACKGROUND

1. Field of the Invention

The present invention relates to an airbag device with a horn switch body which is attached to a main body of a steering wheel of a vehicle.

2. Description of the Related Art

In related art, an airbag device with a horn switch body of this type is configured to be mounted on an upper surface side of a boss portion near a center of a steering wheel. (For example, see JP-A-2016-084005). The airbag device is configured by including an airbag which inflates by receiving inflation gas, an inflator which supplies the inflation gas to the airbag, a pad which covers the folded airbag, a sheet metal mounting base to hold the airbag, the inflator, and the pad, a plurality of horn switch bodies, and a support plate made of sheet metal which supports the horn switch body as a configuration attached to a lower surface side of the mounting base. The horn switch body has an upper-side movable-side contact point and a lower-side fixed-side contact point which are separated when not operating and includes a case made of synthetic resin which surrounds the top, bottom, and sides of the contact portion of both the movable-side contact point and the fixed-side contact point, and further, it is configured to include an assembling pin which protrudes downward from the case and is attached to a main body side of the steering wheel. The mounting base and the support plate have an insertion hole for inserting the main body portion for discharging the inflation gas in the inflator and a plurality (for example, three locations) of mutually opposing portions around the insertion hole are respectively set as a switch disposition portion which enables a case surrounding the contact portion of the horn switch body to be arranged between the mounting base and the support plate. Further, the support plate disposes the switch disposition portion from the lower surface side of the switch disposition portion of the mounting base to a step portion which is recessed by the approximate height of the case, so the case is arranged between the upper surface side of the step portion and the lower surface side of the switch disposition portion in the mounting base. Further, the horn switch body protrudes the lower end side of the assembling pin from inside the case through the support plate and assembles it to a main body side of the steering wheel. In addition, the horn switch body places the movable-side contact point of the contact portion on the lower surface side of a ceiling wall portion of the case in the case and places the fixed-side contact point of the contact portion on the upper end side of the assembling pin provided in the case. Further, the upward movement of the case is regulated by the upper end side of the assembling pin and a spring is arranged between the lower surface side of the case and the lower end side of the assembling pin to bias the case and the lower end side of the assembling pin in a direction to separate them. This spring exerts a biasing force for biasing the airbag device upward from the main body side of the steering wheel.

Then, when the airbag device is pressed downward so that the lower surface side of the case approaches the lower end side of the assembling pin against the biasing force of the spring to operate the horn, that is, when the pad is pressed, the mounting base to which the pad is attached goes down and a switch disposition portion of the mounting base also goes down, and further the movable-side contact point on the lower surface side of the ceiling wall portion in the case of the horn switch body also tries to go down. However, the fixed-side contact point of the contact portion is located at the upper end side of the assembling pin assembled on the steering wheel main body side and stops its position, and thus the descending movable-side contact point comes into contact with the fixed-side contact point and the horn operating circuit is energized to operate the horn. Next, when the pressing operation is stopped, by the biasing force of the spring which biases the airbag device upward, the airbag device including the support plate, the mounting base, and the case of the horn switch body is pushed upward until the lower surface side of the case is regulated by the upper end side of the assembling pin. As a result, the movable-side contact point which is in contact will be separated from the fixed-side contact point and returned to the position before operation.

However, in the airbag device with the horn switch body of the related art, the sheet metal support plate disposes the switch disposition portion where the case of the horn switch body is placed, from the lower surface side of the switch disposition portion of the mounting base to the upper surface side of the recessed step portion by the approximate height of the case. Further, the case of the horn switch body is arranged between the lower surface of the mounting base in the switch disposition portion and the upper surface of the step portion of the support plate. In addition, the support plate forms the step portion from the sheet metal material by drawing. For this reason, due to variations in the dimensional accuracy during processing of the support plate, the upper surface of the step portion may be formed with a gap slightly larger than the height of the case between the lower surface of the switch disposition portion of the mounting plate. In such a case, due to the gap generated between the case and the mounting base of the switch disposition portion or the support plate while the vehicle equipped with the airbag device is travelling, the case may interfere (abut) with the mounting base or the support plate, which may cause abnormal noise.

SUMMARY

The invention solves the problem described above and an object thereof is to provide an airbag device with a horn switch body which can prevent interference with surroundings in a case of the horn switch body that generates abnormal noise with a simple configuration.

According to an aspect of the invention, there is provided an airbag device with a horn switch body which is configured so as to be installed in an upper surface side in a boss portion near a center of a steering wheel, the airbag device including: an airbag which inflates by receiving inflation gas; an inflator for supplying inflation gas to the airbag; a pad covering the folded airbag; a mounting base made of sheet metal which holds the airbag, the inflator, and the pad;

a horn switch body having an assembling pin to be assembled to a main body side of the steering wheel; and a support plate made of a sheet metal which supports the horn switch body as a configuration attached to a lower surface side of the mounting base, wherein: the mounting base and the support plate have an insertion hole for inserting a main body portion for discharging inflation gas in the inflator; a plurality of mutually opposed parts around the insertion hole are respectively set as switch disposition portions which allow a synthetic resin case surrounding the top, bottom, and sides of the contact portion of the horn switch body to be disposed between the mounting base and the support plate; the support plate disposes the switch disposition portion from a lower surface side of the switch disposition portion of the mounting base to a step portion which is recessed by an approximate height of the case, so the case is arranged between an upper surface side of the step portion and a lower surface side of the switch disposition portion in the mounting base; the horn switch body protrudes a lower end side of the assembling pin from inside the case through the support plate and assembles it to a main body side of the steering wheel and places a movable-side contact point of the contact portion on a lower surface side of a ceiling wall portion of the case in the case and places a fixed-side contact point of the contact portion on an upper end side of the assembling pin provided in the case; an upward movement of the case is regulated by an upper end side of the assembling pin and a spring is arranged between a lower surface side of the case and a lower end side of the assembling pin to bias the case and the lower end side of the assembling pin in a direction to separate them; and the case around the assembling pin of the horn switch body, the mounting base of the switch disposition portion, or the support plate is provided with a spacer capable of preventing rattling of the switch disposition portion in the case.

In the airbag device according to the invention, rattling of the switch disposition portion in the case is prevented by the spacer capable of preventing rattling, thereby preventing generation of abnormal noise. Further, by simply placing the spacer on the case around the assembling pin of the horn switch body or on the mounting base or the support plate of the switch disposition portion, such a prevention structure can be simply configured.

Therefore, in the airbag device provided with the horn switch body according to the invention, with a simple configuration, it is possible to prevent interference with the surroundings of the case of the horn switch body which generates abnormal noise.

Further, in the airbag device according to the invention, the spacer may be provided in one of the case, the switch disposition portion of the mounting base, or the switch disposition portion of the support plate, integrally with a surrounding general part, protruding from the general part.

In such a configuration, it is not necessary to separately attach the spacer to the case or the mounting base or the support plate of the switch disposition portion, so that the spacer can be easily arranged.

Further, in the airbag device according to the invention, the spacer may be disposed on one of the mounting base or the support plate.

That is, when the spacer is integrally formed in the synthetic resin case, it is necessary to provide a molding concave portion for forming a spacer in the molding die of the synthetic resin member where the spacer is to be provided and it is difficult to form the spacer in the case itself by post-processing. However, the mounting base and the support plate are made of sheet metal. Further, the spacer can be easily formed by post-processing, such as by pressing or pressing with the pressing pin, or almost simultaneously with processing from a sheet metal material. Therefore, the mounting base and the support plate provided with the spacer can be easily formed from the product of the related art and the mounting base and the support plate provided with the spacer can be easily obtained.

Further, in the airbag device according to the invention, the spacer may be provided on the mounting base, and a plurality of protrusion portions which protrude partially downward from the general part may be provided around the assembling pin.

In such a configuration, the switch disposition portion of the mounting base can be formed without providing the step portion, like the switch disposition portion of the support plate, and can be formed on a flat portion. Thus, two or more protrusion portions constituting the spacer can be easily formed on a flat portion around the assembling pin by post-processing such as pressing with the pressing pin. In addition, for example, when the protrusion portions as the spacer are arranged at three or more places around the assembling pin, each protrusion portion can be pressed and abutted against the planar upper surface side of the case around the assembling pin with good balance. As a result, around the case, it is possible to stably prevent a gap with respect to the support plate and the mounting base of the switch disposition portion that causes abnormal noise from generating. Needless to say, the protrusion portions may be provided at two places around the assembling pin. Even in that case, the two protrusion portions or three places of the two protrusion portions in the switch disposition portion of the mounting base and a portion that is separated from those portions are pressed and abutted against the upper surface of the case. Therefore, around the case, a gap with respect to the support plate and the mounting base of the switch disposition portion that causes abnormal noise can be prevented from generating.

In this case, when the protrusion portions may be disposed at four positions that are the installation positions of the rectangular corners around the assembling pin, each protrusion portion abuts on the upper surface side of the case around the assembling pin in a more balanced manner. As a result, more stably, there is no gap around the case that generates abnormal noise.

In this case, these protrusion portions may be disposed in lateral symmetric positions around the assembling pin or disposed in installation positions of square corners around the assembling pin. If the horn switch body arranged in the center part of the airbag device in the left and right direction has the protrusion portions arranged at four lateral symmetrical positions around the assembling pin, when pressing down the left edge or right edge side of the airbag device (pad), in order to make the horn strokes of both operations equal, the left and right distances around the assembling pin on the upper surface side of the case of the horn switch body are set to be equal and each protrusion portion can be pressed and abutted against the upper surface side of the case. Therefore, evenly, the movable-side contact point can be brought closer to the fixed-side contact point. In addition, when the protrusion portions are arranged at the four installation positions of the square corners around the assembling pin, assuming that the circumferential separation distance around the assembling pin on the upper surface side of the case of the horn switch body is equivalent, each protrusion portion can be pressed and abutted against the upper surface side of the case. Therefore, evenly, the movable-side contact point can be brought closer to the fixed-side contact point.

Furthermore, in the airbag device according to the invention, when the protrusion portions provided in the switch disposition portion of the mounting base are arranged at four positions of the installation positions of square corners around the assembling pin, the case of the horn switch body may have a positioning protrusion, which is fitted into a positioning hole of the switch disposition portion of the support plate, protruding from a lower surface side of a point-symmetric position around the assembling pin, and the protrusion portion may be arranged around the assembling pin at the installation position of the square corner and two of the four protrusion portions are disposed so as to coincide with a diametrical line centered on the assembling pin connecting the two positioning protrusions.

In such a configuration, two positioning protrusions and two protrusion portions are arranged on the diametrical line centered on the assembling pin, and with the assembling pin as the center, two positioning protrusions and four protrusion portions are mutually concentrically arranged. In other words, for the fixed-side contact point of the contact portion formed of the upper end side of the assembling pin, four protrusion portions are arranged concentrically, and with the positioning protrusion interposed, the movable-side contact point of the contact portion on the upper surface side of the case also has a constant circumferential installation position with respect to the assembling pin. For this reason, the installation position of each of the four protrusion portions surrounding the contact portion of the horn switch body with the assembling pin as the center is in a constant arrangement state (concentric radial installation arrangement around the assembling pin). Therefore, the abutment state between the upper surface side of the case for each horn switch body and each protrusion portion at the time of the horn operation can be further stabilized. As a result, when the plurality of horn switch bodies provided in one airbag device are configured as described above, the feel at the time of operating the horn can be improved.

Further, in the airbag device according to the invention, the mounting base may be provided with a bead which partially protrudes upward from the general part and be arranged linearly so as to traverse the switch disposition portion while avoiding the protrusion portion.

In such a configuration, the switch disposition portion in the mounting base can increase the rigidity and suppress the bending deformation near the protrusion portion. Thus, each protrusion portion can be stably pressed and abutted against the planar upper surface side of the case around the assembling pin. Therefore, around the case, it is possible to further prevent a gap of the switch disposition portion with respect to the support plate or the mounting base, which would cause abnormal noise, from generating.

Further, in the airbag device according to the invention, the bead may be disposed on a straight line in a direction substantially along a tangent to a periphery of the insertion hole near each of the switch disposition portions and on a diametric line centered on the assembling pin.

In such a configuration, the bead disposed at each switch disposition portion of the mounting base is disposed on a straight line substantially along the tangent to the periphery of the insertion hole of the mounting base near each switch disposition portion. Therefore, even when a long linear bead is arranged, it is difficult to interfere with the mounting seat of the mounting base for attaching the inflator and the airbag around the insertion hole, and thus the bead can be smoothly arranged.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 8 is a side view of the mounting base in the airbag device of the embodiment;

FIG. 9 is a bottom view of the mounting base in the airbag device of the embodiment;

DETAILED DESCRIPTION OF THE INVENTION

Figure 1:
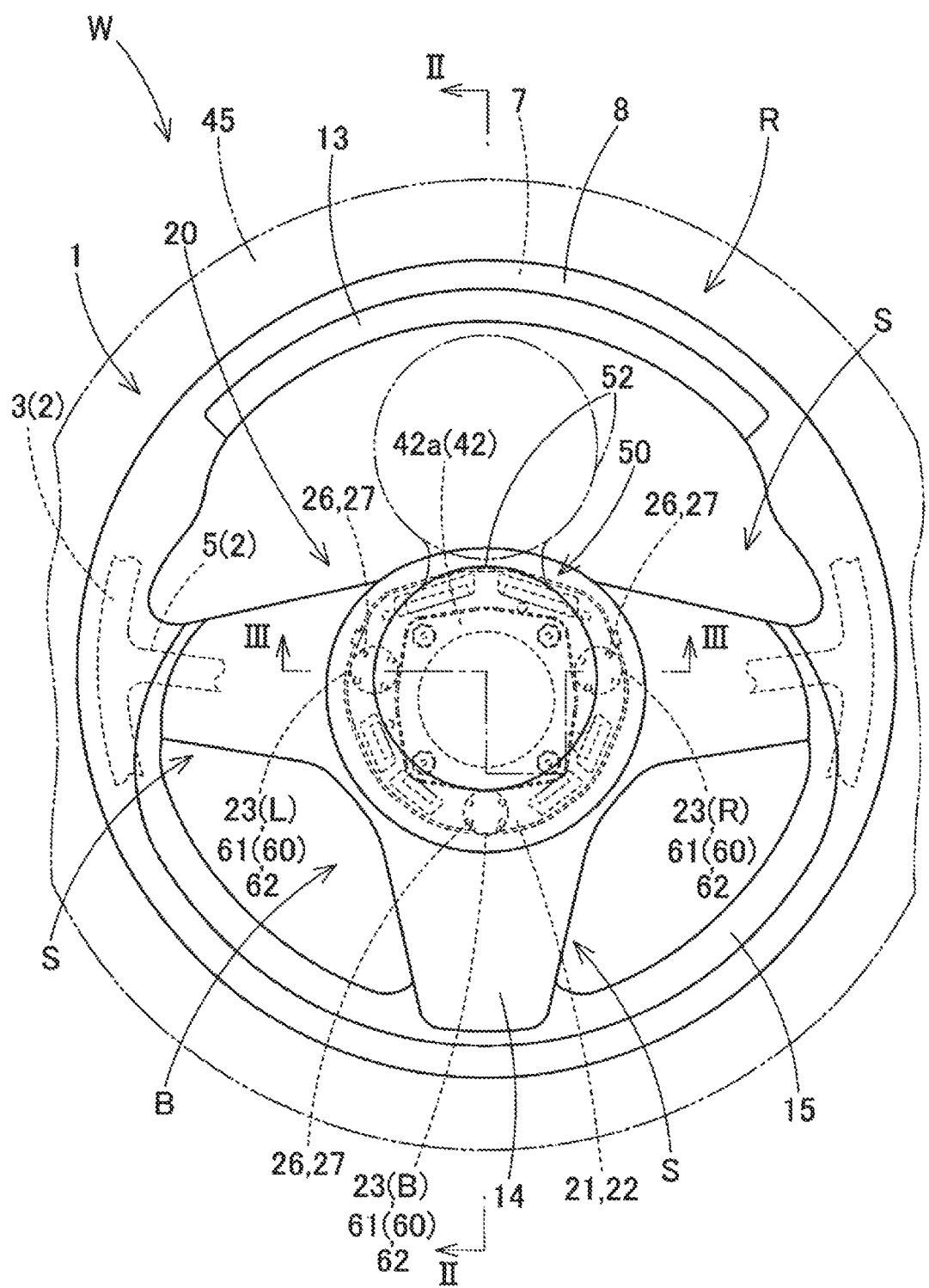
FIG. 1 is a schematic plan view of a steering wheel equipped with an airbag device according to an embodiment of the invention.

Hereinafter, when an embodiment of the invention is described with reference to the drawings, as illustrated in FIG. 1, a steering wheel W on which an airbag device 20 of the embodiment is mounted includes a main body (steering wheel main body) 1 of a steering wheel W having a ring portion R gripped at the time of steering, a boss portion B disposed at the center of the ring portion R, and a spoke portion S connecting the ring portion R and the boss portion B and the airbag device 20 disposed above the boss portion B.

Regarding the directions of up-down, left-right, and front-back in the present specification, based on the straight steering of a vehicle in a state where the steering wheel W is connected to a steering shaft SS (see FIG. 2) of the vehicle with a nut N fixed thereto, the up-down direction corresponds to a vertical direction along an axial direction of the steering shaft SS and the left-right direction corresponds to a left-right direction of the vehicle in a direction orthogonal to an axis of the steering shaft SS, and further the front-back direction corresponds to a front-back direction of the vehicle in a direction orthogonal to the axis of the steering shaft SS.

The steering wheel main body 1 includes a core metal 2 arranged to interconnect the ring portion R, the boss portion B, and the spoke portion S and a coating layer 7 made of urethane or the like which covers the portion of the core metal 2 of the ring portion R and the spoke portion S near the ring portion R. Leather 8 is wound around the surface of the coating layer 7. Further, decorative garnishes 13 and 15 are arranged on the inner peripheral sides of the front and rear portions of the ring portion R.

The core metal 2 includes a ring core metal part 3 which is arranged in the ring portion R, a boss core metal part 4 which is arranged in the boss portion B and connected to the steering shaft SS, and spoke core metal parts 5 which are arranged in the left and right spoke portions S and connect the ring core metal part 3 and the boss core metal part 4. In a case of the embodiment, the spoke core metal parts 5 are disposed only in the two left and right spoke portions S on the front side and a bezel 14 surrounding a pad 50 is disposed on the spoke portion S on the rear side.

Figure 2:
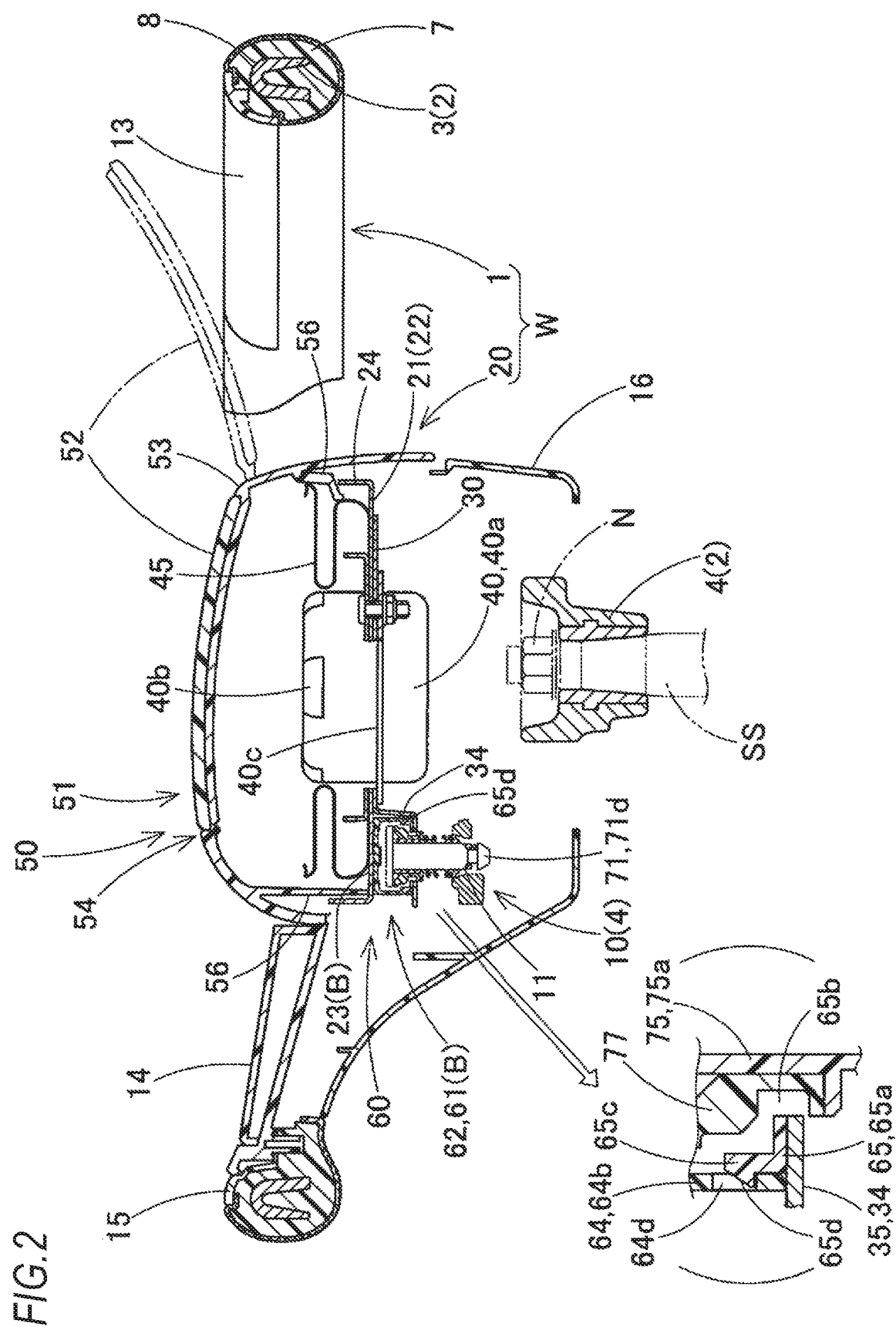
FIG. 2 is a schematic longitudinal cross-sectional view of the steering wheel of the embodiment and corresponds to an II-II part in FIG. 1.
Figure 3:
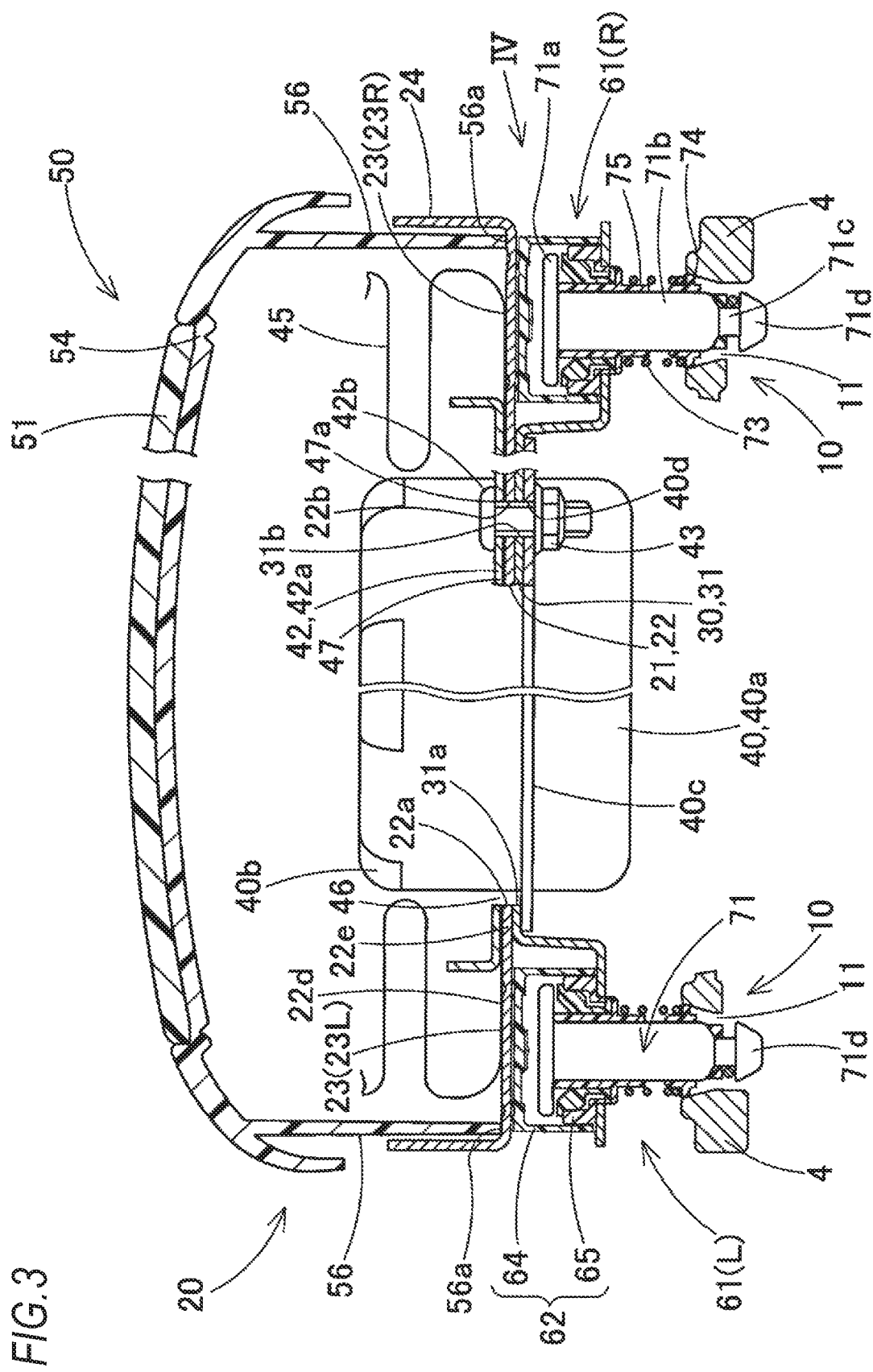
FIG. 3 is a schematic longitudinal cross-sectional view of the airbag device of the embodiment and corresponds to an III-III part in FIG. 1.
Figure 4:
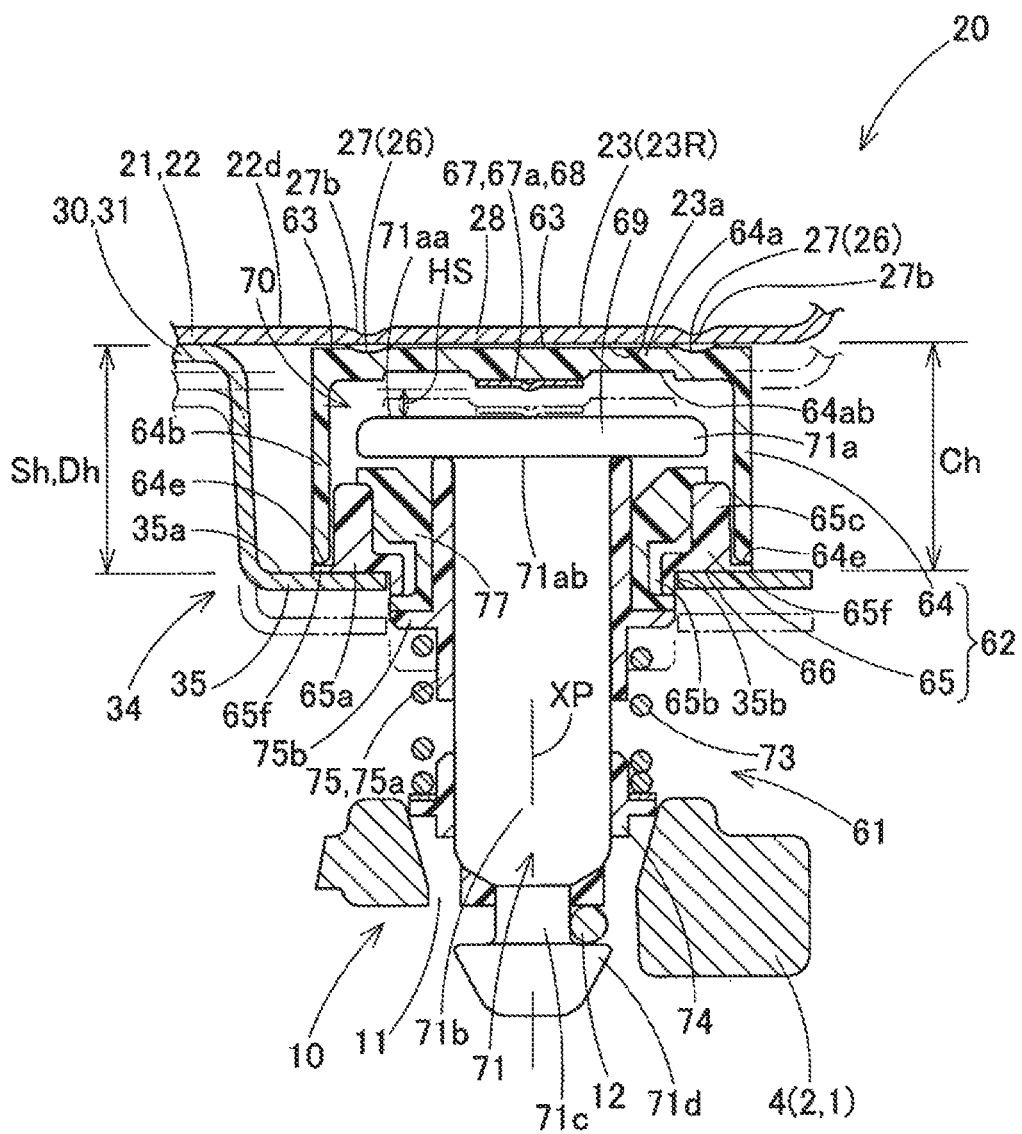
FIG. 4 is a schematic enlarged longitudinal cross-sectional view of a portion where a horn switch body according to the embodiment is provided and is an IV part in FIG. 3.

At the periphery of the boss core metal part 4 of the core metal 2, an assembling portion 10 for assembling an assembling pin 71 of each horn switch body 61 in a horn switch mechanism 60 of the airbag device 20 is provided (see FIGS. 2 to 4). The assembling portion 10 is configured by being provided with an assembling hole 11 penetrating downward in a tapered shape and a locking pin 12 disposed on a lower surface side of the boss core metal part 4 and locking a locking protrusion 71*d* of the assembling pin 71. The locking pin 12 is formed from a resilient spring material along the lower surface of the boss core metal part 4 in a restorable manner.

Further, the steering wheel main body 1 is configured by disposing a lower cover 16 on the lower surface side of the boss portion B (see FIG. 2).

As illustrated in FIGS. 1 to 6, the airbag device 20 is configured by including an airbag 45 which inflates by receiving inflation gas, an inflator 40 for supplying inflation gas to the airbag 45, a synthetic resin pad 50 which covers the folded airbag 45 and is located on the upper surface side of the boss portion B, a mounting base 21 which is made of sheet metal and holds the airbag 45, the inflator 40, and the pad 50, a support plate 30 made of sheet metal, and a retainer 42 made of sheet metal. Further, the airbag device 20 has the horn switch mechanism 60 provided with three horn switch bodies 61 as assembling members on the lower side. A case 62 which covers a contact portion 70 (movable-side contact point 68 and fixed-side contact point 69) is disposed between a lower surface 23*a* of a switch disposition portion 23 of the mounting base 21 and an upper surface 35*a* of a mounting seat 35 as a switch disposition portion of the support plate 30, in such a manner that each horn switch body 61 is held on the lower surface side of the airbag device 20.

The airbag 45 has a substantially disk-shaped, approximated to a sphere shape, expansion completion shape having a thickness and includes an inflow opening 46 which is open in a circular shape in order to allow the inflation gas to flow into the lower side. Further, in the airbag 45, on a peripheral edge 47 of the inflow opening 46, four through holes 47*a* (see FIG. 3) through which bolts 42*b* pass are formed as fixing means of the retainer 42.

The inflator 40 includes a main body portion 40*a* having a cylindrical shape and provided with a plurality of gas discharge ports 40*b* for discharging the inflation gas at an upper portion. On the outer peripheral surface of the main body portion 40*a* of the inflator 40, a flange portion 40*c* (see FIGS. 3 and 10) having a rectangular annular shape is protruded. The flange portion 40*c* has a through hole 40*d* through which the bolt 42*b* of the retainer 42 passes.

As illustrated in FIG. 1, the retainer 42 includes a rectangular-annular-shaped main body portion 42*a* made of sheet metal and has bolts 42*b* (see FIGS. 3 and 10) protruding downward at four corners. The retainer 42 is arranged at the peripheral edge 47 of the inflow opening 46 in the airbag 45. By making each bolt 42*b* pass through the through hole 47*a* of the airbag 45, the through hole 22*b* of the mounting base 21, the through hole 40*d* of the flange portion 40*c* of the inflator 40, and the through hole 31*b* of the support plate 30 in order and fastening the nut 43 to the bolt 42*b*, the retainer 42 makes the airbag 45, the inflator 40, and the support plate 30 attached to the mounting base 21 (see FIG. 3).

As illustrated in FIGS. 1 to 3, 6, and 10, the pad 50 is made of a synthetic resin such as an olefin-based thermoplastic elastomer and is disposed on the upper surface side of the boss portion B near the center of the steering wheel W. The pad 50 is configured by including a ceiling wall portion 51 which covers the upper part of the airbag 45 which is folded and stored inside the boss portion B and a side wall portion 56 extending substantially cylindrically from the lower surface of the ceiling wall portion 51 and covering the lateral sides (outer peripheral side) of the front, rear, left, and right sides of the folded airbag 45.

On the ceiling wall portion 51, a door portion 52 which is pushed by the inflating airbag 45 and opens forward is provided. The door portion 52 is configured such that a hinge portion 53 is provided on the front edge side and a thin-walled breakable portion 54 is provided around a surrounding portion except for the hinge portion 53.

Figure 6:
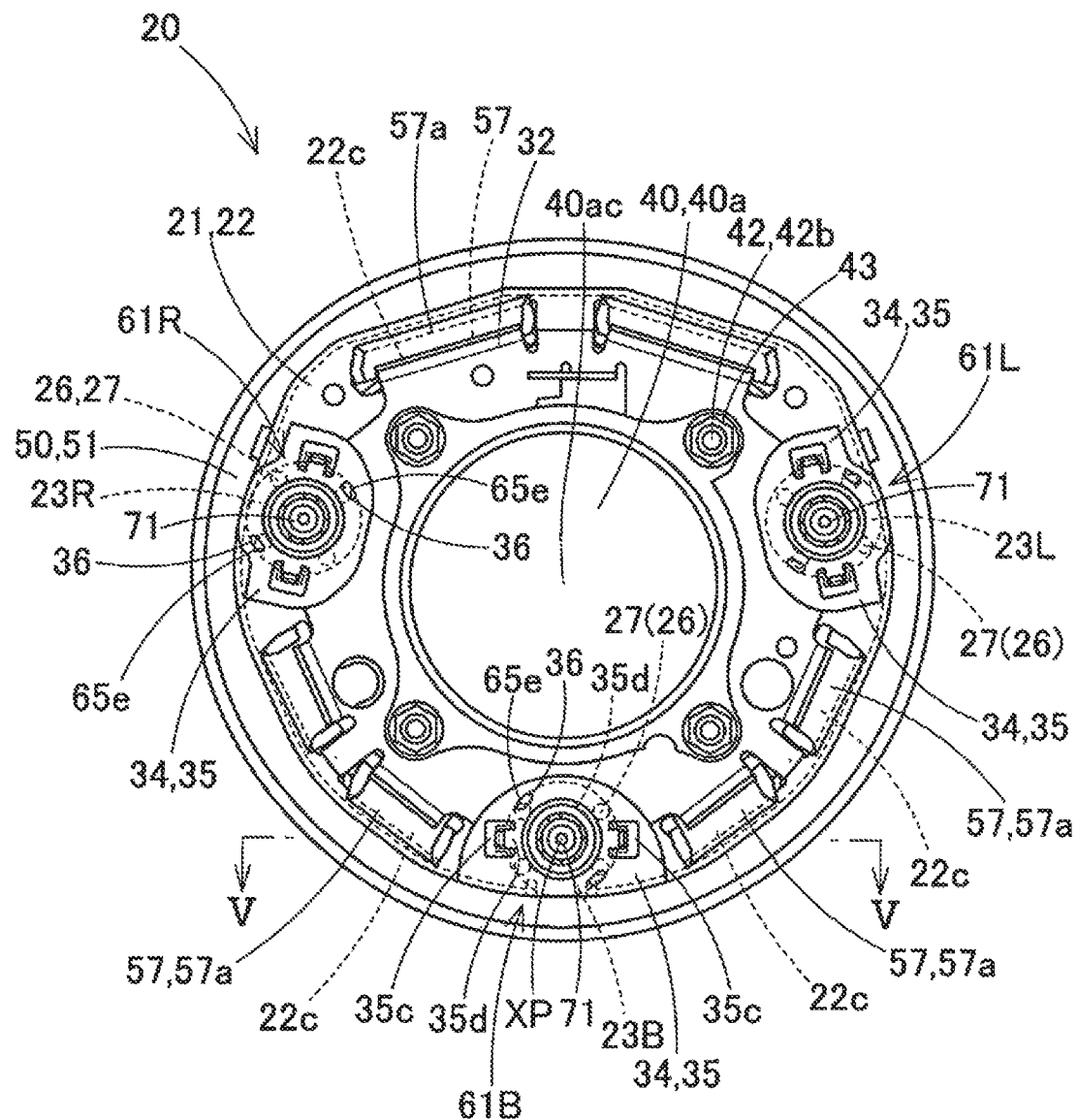
FIG. 6 is a bottom view of the airbag device of the embodiment.
Figure 7:
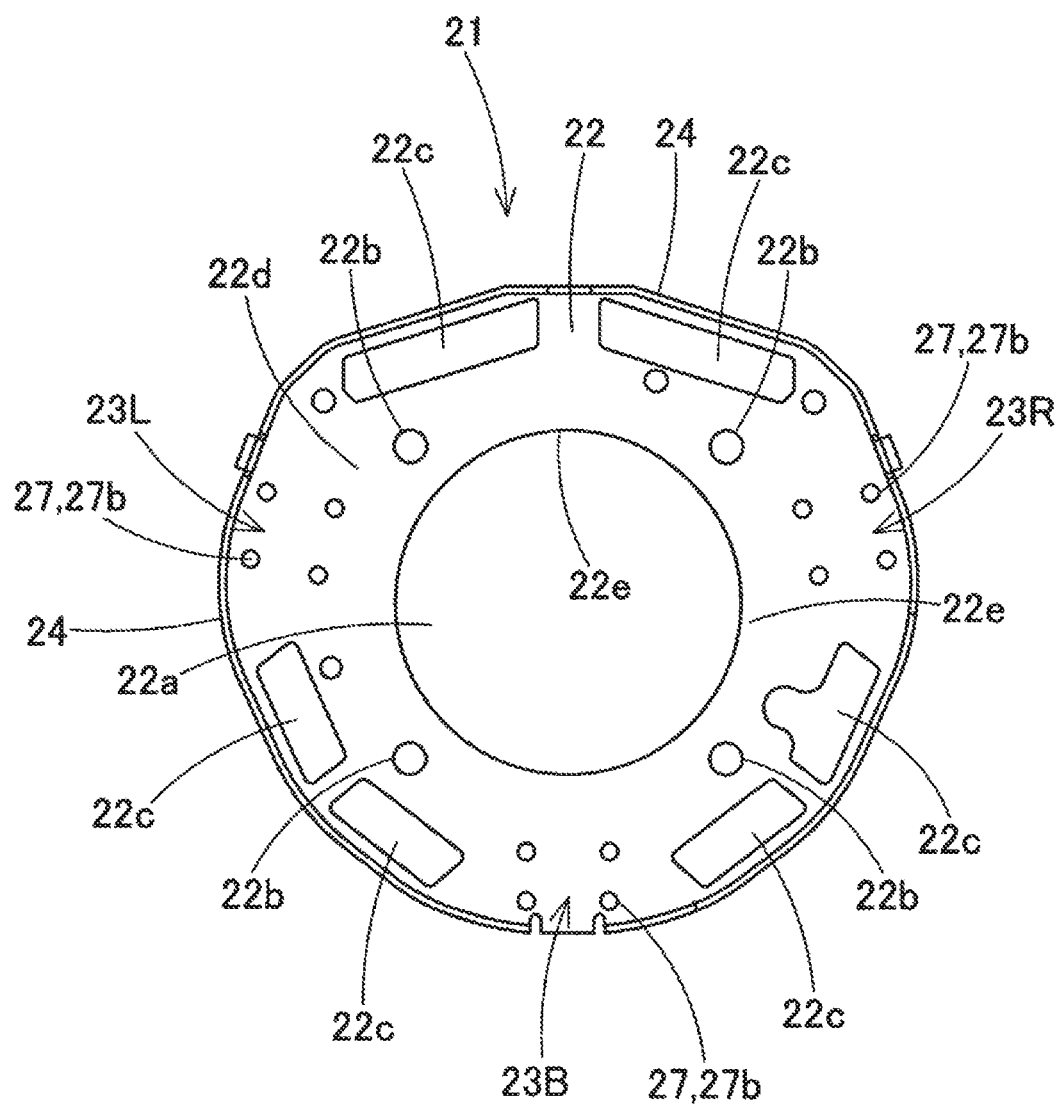
FIG. 7 is a plan view of a mounting base in the airbag device of the embodiment.
Figure 10:
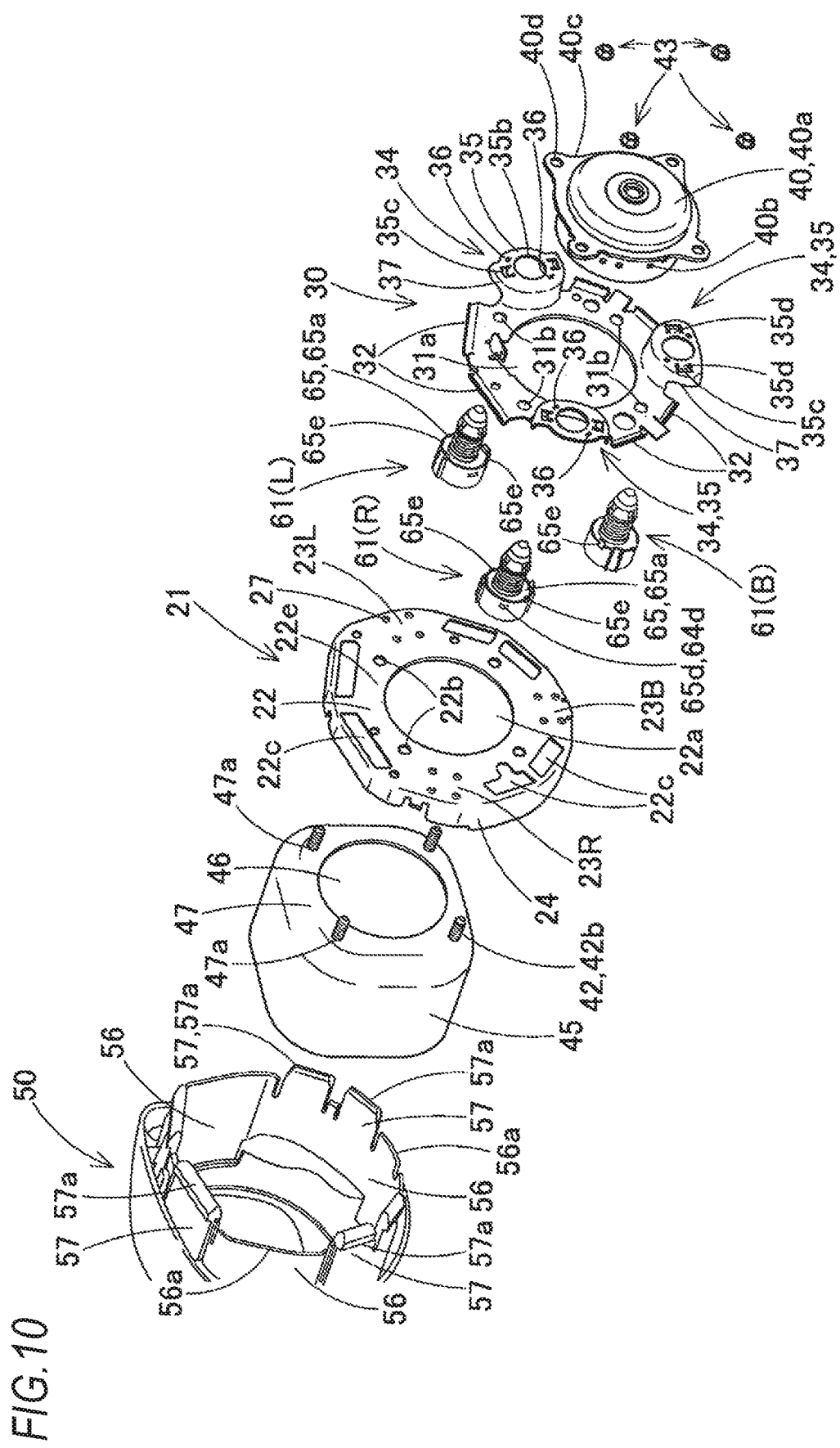
FIG. 10 is a schematic exploded perspective view of the airbag device of the embodiment.
Figure 12:
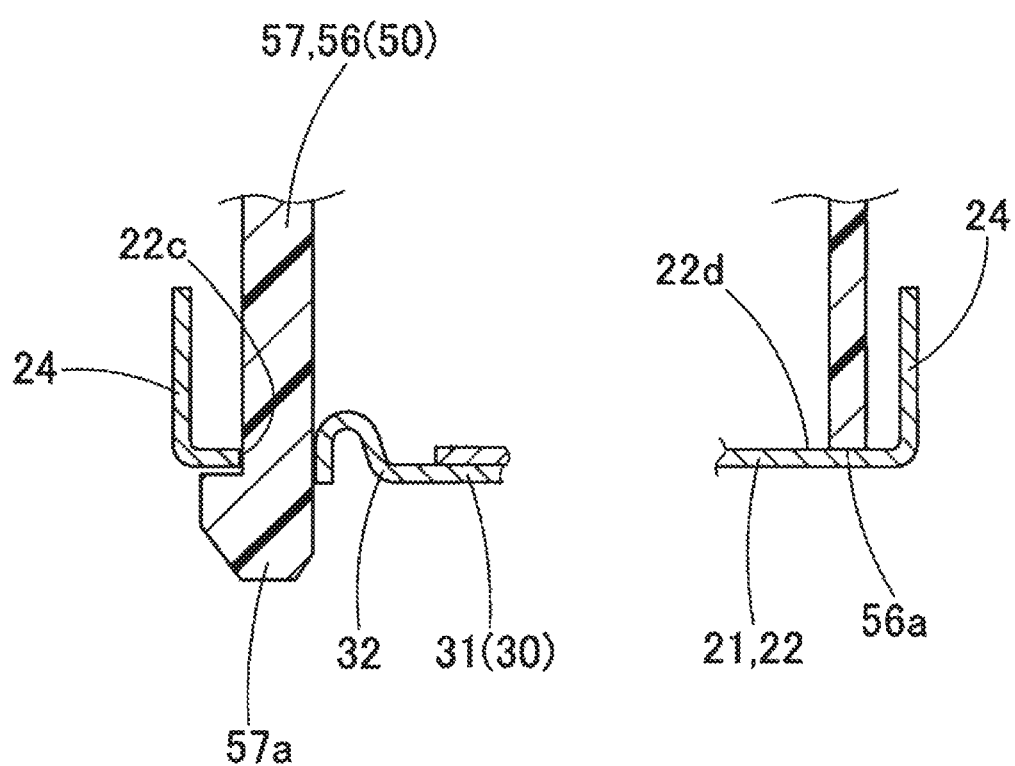
FIG. 12 is a schematic partial cross-sectional view illustrating a mounting structure of a locking leg portion to the mounting base in a pad of the airbag device of the embodiment.

As illustrated in FIGS. 6, 10, and 12, the side wall portion 56 of the pad 50 has two locking leg portions 57 at each lower end of the front edge side and the left and right rear edge sides. Each locking leg portion 57 is inserted into a locking hole 22*c* provided in a mounting plate portion 22 of the mounting base 21 and is pressed outward against a pressing piece 32 of the support plate 30 at a peripheral edge of the locking hole 22*c*, in such a manner that a locking head portion 57*a* at the tip end is locked to the periphery of the locking hole 22*c*. Then, in a state where a lower end surface 56*a* of the side wall portion 56 abuts on an upper surface 22*d* of the mounting plate portion 22 of the mounting base 21, the locking of the locking leg portion 57 to the periphery of the locking hole 22*c* by the head portion 57*a* allows the pad 50 to be attached to the mounting base 21 without being shifted up and down or shifted back and forth and left and right.

The mounting base 21 is made of sheet metal and holds the airbag 45, the inflator 40, the pad 50, and the support plate 30, as illustrated in FIGS. 2 to 10. Further, the mounting base 21 is configured as a sheet metal member which attaches the airbag device 20 to the steering wheel main body 1 side using the assembling pin 71 of the horn switch body 61. The mounting base 21 includes a mounting plate portion 22 having a substantially annular shape and a side wall portion 24 protruding upward from the outer peripheral edge of the mounting plate portion 22.

The mounting base 21 is formed by punching, bending, or the like from a flat sheet metal material.

In the center of the mounting plate portion 22, an insertion hole 22*a* having a circular opening for inserting the cylindrical main body portion 40*a* of the inflator 40 is provided, and around the insertion hole 22*a*, there is provided a through hole 22b through which each bolt 42b of the retainer 42 passes. In addition, on the rear edge side and the left and right front edge sides of the periphery of the insertion hole 22a of the mounting plate portion 22, a support seat 23 (23L, 23R, 23B) as a switch disposition portion which covers the upper side of each horn switch body 61 is provided by disposing the lower surface 23a side so as to abut on an upper surface 63 side of the case 62 of each horn switch body 61.

Each support seat 23 is provided with four protrusion portions 27 protruding downward from a general part 28 around the support seat 23. Each protrusion portion 27 is formed by pressing a flat plate portion with a push pin P or the like (see FIG. 8) to provide a concave surface 27b which is concave in a mortar shape on the upper surface side, while protruding a top portion 27a which protrudes downward from the general portion 28 therearound. Therefore, each protrusion portion 27 is formed in a spherical shell-like curved surface. Each protrusion portion 27 of each support seat 23 forms a spacer 26 for preventing rattling of the case 62 of the horn switch body 61.

The reason for arranging the spacer 26 is that, even when a height dimension Ch (see FIG. 4) of the case 62 has a certain degree of dimensional accuracy, if an accommodation height dimension Sh between the lower surface 23a of the support seat 23 of the switch disposition portion and the upper surface 35a of a step portion 34 described below, which are provided between the mounting base 21 and the support plate 30 made of sheet metal for accommodating the case 62, is larger than the height dimension Ch of the case 62 due to variation in processing accuracy, particularly, variation in a depth dimension Dh of the step portion 34 of the drawing process from a plate main body portion 31 described below, the case 62 interferes with the lower surface 23a of the support seat 23 of the switch disposition portion and the upper surface 35a of the step 34 during traveling of a vehicle and this may cause abnormal noise. In order not to create a gap (rattle) which generates the abnormal noise, in the embodiment, the spacer 26 is provided to positively hold the case 62 between the lower surface 23a of the support seat 23 and the upper surface 35a of the step portion 34 to prevent rattling, in such a manner that the abnormal noise generation is prevented.

In a case of the embodiment, in each support seat 23, each protrusion portion 27 is disposed at a position corresponding to four corners of a rectangle around an axis (center axis) XP of the assembling pin 71 (see FIG. 9). In particular, in the left and right support seats 23L and 23R, each protrusion portion 27 is disposed at each corner portion of a square (regular square) centered on the axis (center axis) XP of the assembling pin 71. In the support seat 23B on the rear side in the center in the left and right direction, the left and right two front and rear protrusion portions 27 are arranged at lateral symmetric positions with respect to the center line CL passing through the center in the left and right direction of the mounting base 21 (airbag device 20).

In a case of the embodiment, a protruding height T (see FIG. 8) of each protrusion portion 27 from the general part 28 is set to about 0.5±0.1 mm. The height dimension Ch of the case 62 is about 12.6±0.3 mm and an accommodation height dimension Sh is about 12.6±0.1 mm.

Further, between each support seat 23 of the mounting plate portion 22, the locking hole 22c for inserting and locking each locking leg portion 57 of the pad 50 is opened. Further, the side wall portion 24 extending upward is formed on the outer peripheral edge of the mounting plate portion 22.

As illustrated in FIGS. 2 to 6, 10, and 11, in the center of the support plate 30, an annular plate main body portion 31 having an insertion hole 31a which is circularly opened to insert the main body portion 40a of the inflator 40 is provided, and at the outer peripheral edge of the plate main body portion 31, there is provided the step portion 34 having a step recessed downward so as to provide a step. The pressing piece 32 is provided between the step portions 34 of the plate main body portion 31. Each pressing piece 32 locks the locking head portion 57a of the locking leg portion 57 of the pad 50 inserted in the locking hole 22c of the mounting base 21 at the periphery edge of the locking hole 22c (see FIG. 12). Therefore, when inserting the locking leg portion 57 into the locking hole 22c, the tip end side is bent to the insertion hole 31a side and is restored after insertion and the locking head portion 57a of the locking leg portion 57 is pressed against the peripheral edge side of the locking hole 22c, so it acts to prevent the locking head portion 57a from coming out of the locking hole 22c.

Each step portion 34 is arranged so as to correspond to the arrangement position of each support seat 23 of the mounting base 21 on the rear edge side and the left and right front edge sides of the peripheral edge of the insertion hole 31a and constitutes a switch disposition portion on the support plate 30 side. Then, the case 62 of the horn switch body 61 is disposed between the upper surface 35a of the step portion 34 and the lower surface 23a of the support seat 23 of the mounting base 21 as the switch disposition portions.

That is, each step portion 34 of the support plate 30 is disposed immediately below the flange portion 40c of the inflator 40 and each support seat 23 of the mounting plate portion 22 by the bolt 42b and the nut 43 of the retainer 42, and thus it is disposed between the upper surface 35a of the step portion 34 and the lower surface 23a of the support seat 23 of the mounting base 21 so as to interpose the upper and lower sides of each case 62.

Further, each step portion 34 constitutes the mounting seat 35 to which the horn switch body 61 is assembled. In addition, each mounting seat 35 includes an insertion hole 35b through which the assembling pin 71 of the horn switch body 61 and a sliding cylindrical portion 75a of a sleeve 75 surrounding the assembling pin 71 are inserted and a pair of locking holes 35c and a pair of positioning holes 36 are disposed on both sides of the insertion hole 35b. A locking claw 35d extending upward in an L-shaped cross section is provided on the periphery of the locking hole 35c on the side of the insertion hole 35b (see FIGS. 5, 6, and 11).

In a plan view, the pair of positioning holes 36 are arranged in point symmetry with respect to the axis XP of the assembling pin 71 which is inserted into the insertion hole 35b and are disposed so as to coincide with a diametrical straight line DL of the insertion hole 35b passing through the axis XP. Furthermore, in the support seats 23L and 23R as the switch disposition portions, the pair of positioning holes 36 are disposed so as to coincide with two protrusion portions 27 of each support seat 23 of the mounting base 21 (see FIGS. 6 and 9). However, in the support seat 23B as the switch installation portion at the center in the left-right direction, the pair of positioning holes 36 are arranged slightly shifted from the protrusion portion 27 of each support seat 23 of the mounting base 21. As shown in parentheses in FIG. 9, in the support seat 23B as well, the pair of positioning holes 36 may be provided so as to coincide with two protrusion portions 27 of each support seat 23 of the mounting base 21.

Figure 11:
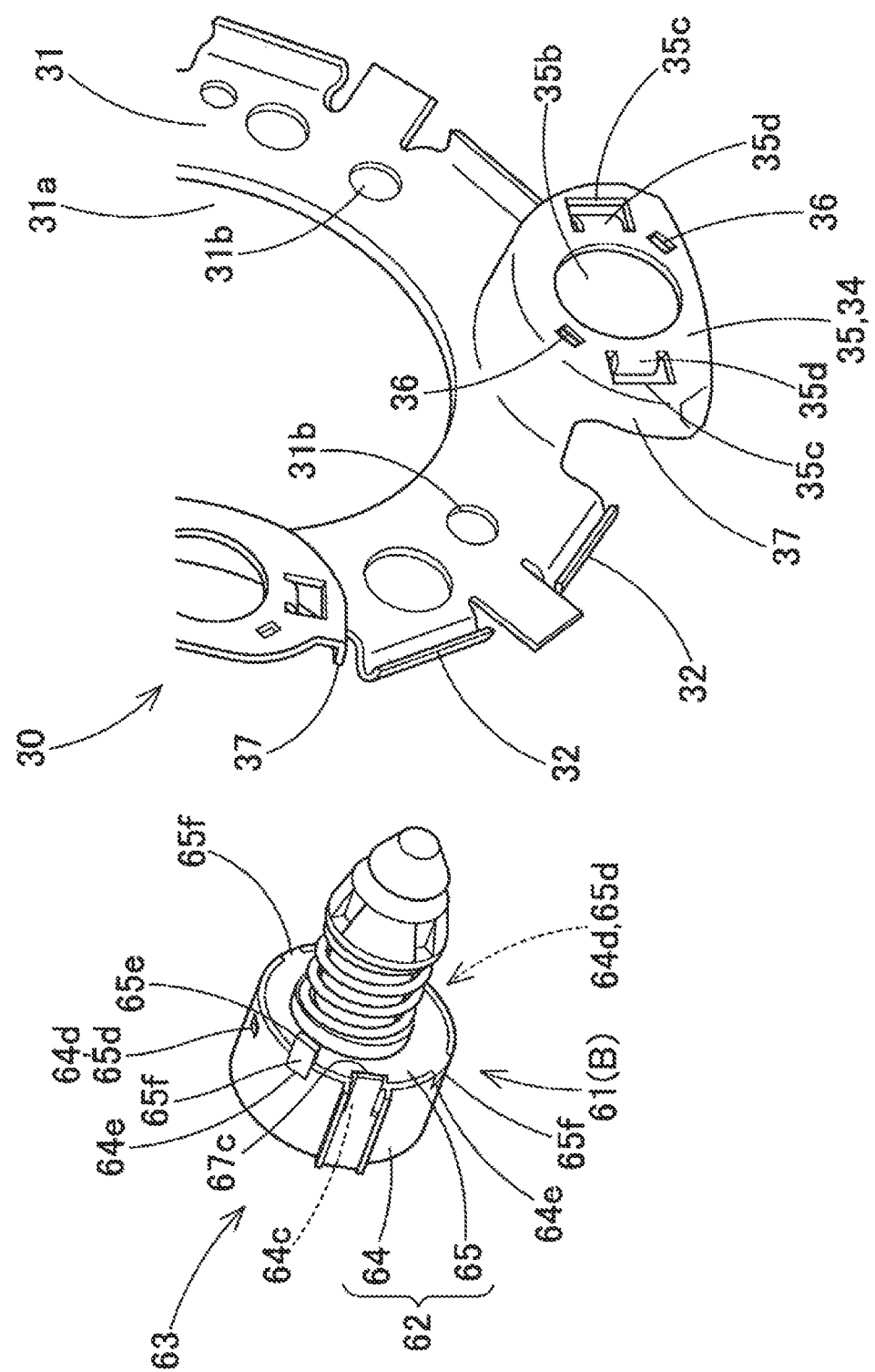
FIG. 11 is a schematic partial perspective view illustrating the horn switch body and a step portion in the airbag device of the embodiment.

Further, a reinforcing rib 37 extending upward is provided on the outer peripheral edge of each mounting seat 35 (see FIG. 11).

The support plate 30 is formed from a flat sheet metal material by punching or drawing. In particular the step portion 34 is formed by deep drawing so as to be recessed downward from the plate main body portion 31 and processing variations are likely to occur in a step dimension Sh recessed from the plate main body portion 31 of the upper surface 35a of the mounting seat 35.

Figure 5:
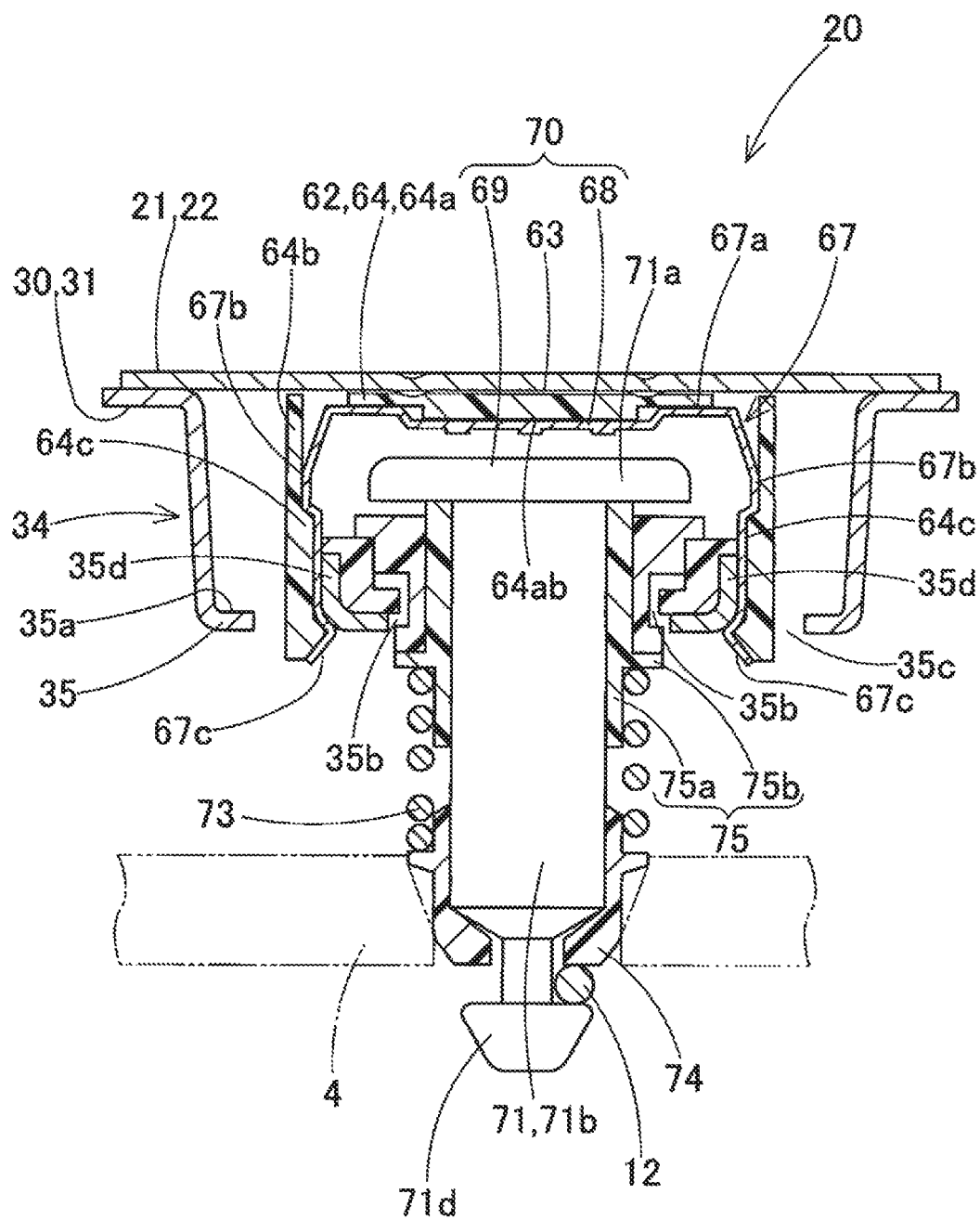
FIG. 5 is a schematic enlarged longitudinal cross-sectional view of the portion where the horn switch body according to the embodiment is provided and is a V-V part in FIG. 6.

Each horn switch body 61 is configured by including the contact portion 70 having the movable-side contact point 68 and the fixed-side contact point 69 arranged to close the horn operation circuit during mutual contact, the substantially cylindrical case 62 arranged to cover the top and bottom and sides of the contact portion 70, the assembling pin 71 attached to the assembling portion 10 of the steering wheel main body 1, and a coil spring 73 as biasing means (see FIGS. 4 and 5).

The case 62 includes an upper portion 64 and a lower portion 65 made of a synthetic resin such as polypropylene and a movable-side contact point material 67 having a movable-side contact point 68 is attached to the upper part 64 side which is the upper surface 63 side in the case 62. The upper portion 64 and the lower portion 65 are both formed by injection molding using a mold having a corresponding cavity.

The upper portion 64 includes the substantially disk-shaped ceiling wall portion 64a and a peripheral wall portion 64b extending downward from the outer peripheral edge of the ceiling wall portion 64a. In the peripheral wall portion 64b, locking holes 64d for locking locking claws 65d of the lower portion 65 are formed at two point-symmetrical positions (see FIGS. 2, 10, and 11) and fitting holes 64e for the fitting fitting protrusions 65f of the lower portion 65 are formed at four point-symmetrical positions (see FIGS. 4 and 11). Two of the installation positions of the four positions of the corresponding fitting protrusions 65f and fitting holes 64e are located at the installation positions of positioning protrusions 65e.

Further, a horizontal rod portion 67a of the movable-side contact point material 67 having the movable-side contact point 68 is provided at the center of a lower surface 64ab of the ceiling wall portion 64a. On the inner peripheral surface side of the peripheral wall portion 64b, a locking protrusion portion 64c for locking a vertical rod portion 67b of the movable-side contact point material 67 is formed.

The lower portion 65 is provided with an annular bottom wall portion 65a having an insertion hole 65b for inserting the assembling pin 71 in the center and a peripheral wall portion 65c extending from the inner peripheral edge of the bottom wall portion 65a to the inner peripheral side of the peripheral wall portion 64b of the upper portion 64 is provided. In the peripheral wall portion 65c, the locking claws 65d which are inserted and locked in the locking holes 64d from the inner peripheral side of the peripheral wall portion 64b of the upper portion 64 are formed at point-symmetric positions about the insertion hole 65b (see FIG. 2). Further, at the point-symmetric positions about the insertion hole 65b (the axis XP of the assembling pin 71) on the lower surface of the bottom wall portion 65a, the positioning protrusions 65e which are inserted and fitted in the positioning holes 36 in the mounting seat 35 of the support plate 30 are disposed so as to protrude downward (see FIGS. 6 and 9). In addition, the fitting protrusion 65f which fits into each fitting hole 64e of the upper portion 64 is formed on the outer peripheral edge of the bottom wall portion 65a (see FIG. 11).

In the case 62, the peripheral wall portion 65c of the lower portion 65 is inserted into the peripheral wall portion 64b of the upper portion 64 and each fitting protrusion 65f is inserted into the corresponding fitting hole 64e and abuts against the lower end surface of the peripheral wall portion 64b, and further each locking claw 65d is locked to the corresponding locking hole 64d, in such a manner that the case 62 can be assembled by assembling the upper portion 64 and the lower portion 65.

One movable-side contact point 68 of the contact portion 70 is formed in the movable-side contact point material 67. The movable-side contact point material 67 is formed from a plate material such as a copper plate having conductivity and has a band-shaped inverted U-shape including the horizontal rod portion 67a provided with the movable-side contact point 68 and the vertical rod portions 67b extending downward from both edges of the horizontal rod portion 67a (see FIG. 5). At the lower end of the vertical rod portion 67b, a locking claw portion 67c which engages with the locking claw 35d of the mounting seat 35 of the support plate 30 is provided. In the movable-side contact point material 67, the vertical rod portions 67b and 67b are arranged on the inner peripheral side of the peripheral wall portion 64b of the upper portion 64 in the case 62 so as to engage with the locking protrusion portions 64c and the movable-side contact point 68 constituted of the horizontal rod portion 67a is arranged at the center of the lower surface 64ab of the ceiling wall portion 64a on the upper surface 63 side of the case 62.

The other fixed-side contact point 69 of the contact portion 70 is formed from a head portion 71a on the upper end side of the assembling pin 71. The assembling pin 71 is formed from a steel rod or the like and includes the flange-shaped head portion 71a disposed below the movable-side contact point 68 in the case 62 and a shaft portion 71b extending downward from the head portion 71a. The shaft portion 71b has the locking protrusion 71d provided with a locking groove 71c at the lower end. When the locking protrusion 71d is inserted into the assembling hole 11 of the assembling portion 10 of the steering wheel main body 1, the locking protrusion 71d is locked by the locking pin 12 which is restored after bending and inserted into the locking groove 71c, so the assembling pin 71 will be assembled to the assembling portion 10 of the steering wheel main body 1.

Further, in a case of the embodiment, the head portion 71a itself on the upper surface side of the assembling pin 71 constitutes the fixed-side contact point 69, as described above and the head portion 71a of the assembling pin 71 has an outer dimension where it does not fall downward from the insertion hole 65b of the lower portion 65 of the case 62.

In a case of the fixed-side contact point 69, the assembling pin 71 is assembled to the assembling portion 10 of the core metal 2 of the steering wheel main body 1, whereby the fixed-side contact point 69 conducts to the negative electrode side of the horn operation circuit. In a case of the movable-side contact point 68, the contact is performed by making the locking claw portion 67c of the movable-side contact point material 67 locked against the locking claw 35d of the support plate 30 which conducts to the positive electrode side of the horn operation circuit, whereby the movable-side contact point 68 conducts to the positive electrode side of the horn operation circuit. Therefore, when the contact points 68 and 69 come into contact with each other, the horn operation circuit is closed and energized to operate the horn.

The coil spring 73 as the urging means urges the movable-side contact point 68 to separate from the fixed-side contact point 69 by a horn stroke HS (see FIG. 4) of the horn. In a case of the embodiment, the coil spring 73 is disposed between the locking protrusion 71*d* side at the lower end of the assembling pin 71 and a lower surface 66 side of the case 62 and urges them so as to separate from each other. Specifically, on the lower end side of the assembling pin 71, a spring seat 74 to be fitted to the locking groove 71*c* is arranged, and on the lower surface 66 side of the case 62, the sleeve 75 slidably disposed around the shaft portion 71*b* is disposed, and further a spring 73 is disposed between the spring seat 74 and a flange portion 75*b* of the sleeve 75. The sleeve 75 includes the cylindrical sliding cylindrical portion 75*a* slidably disposed on the shaft portion 71*b* of the assembling pin 71 and the flange portion 75*b* disposed on the outer peripheral surface of the sliding cylindrical portion 75*a* The flange portion 75*b* supports the upper end of the coil spring 73 of which the lower end is supported by the spring seat 74 and abuts on the bottom wall portion 65*a* of the lower portion 65 of the case 62 via a damper 77. Further, the sleeve 75 has the upper end of the sliding cylindrical portion 75*a* abutted on the lower surface 71*ab* of the head portion 71*a* of the assembling pin 71 and the head portion 71*a* of the assembling pin 71 is prevented from coming off from the lower surface 66 side of the case 62 with the sliding cylindrical portion 75*a* of the sleeve 75 interposed therebetween.

The damper 77 is made of substantially cylindrical rubber or the like. The damper 77 is disposed around the sliding cylindrical portion 75*a* of the sleeve 75 between the head portion 71*a* of the assembling pin 71 and the lower portion 65 and is provided so as to prevent generation of abnormal noise due to contact between the head portion 71*a* of the assembling pin 71 and the lower portion 65.

In the airbag device 20 of the embodiment, when assembling, first, with each bolt 42*b* protruding from the through hole 47*a*, the retainer 42 is put inside the airbag 45 and the airbag 45 is folded, and then the airbag 45 is wrapped with a wrapping material (not illustrated) for preventing collapse. Also, in the mounting seat 35 of each step portion 34 in the plate main body portion 31 of the support plate 30, with the shaft portion 71*b* of the assembling pin 71 protruding from the insertion hole 35*b*, the locking claw portion 67*c* is locked to the locking claw 35*d* of the locking hole 35*c*, whereby the assembled horn switch body 61 is assembled in advance.

Then, in a state where the insertion holes 22*a* and 31*a* and the through holes 22*b* and 31*b*, and further the support seat 23 and the mounting seat 35 with the horn switch body 61 assembled together are aligned, the support plate 30 is arranged below the mounting base 21. In addition, on a mounting seat 22*e* on the periphery of the insertion hole 22*a* of the mounting base 21, the peripheral edge 47 of the inflow opening 46 of the airbag 45 is arranged and each bolt 42*b* of the retainer 42 is inserted through the through holes 22*b* and 31*b* of the mounting base 21 and the support plate 30. Furthermore, in a state where the main body portion 40*a* of the inflator 40 passes through the insertion holes 22*a* and 31*a* of the mounting base 21 and the support plate 30 and is inserted into the airbag 45, each bolt 42*b* of the retainer 42 protruding from the through holes 22*b* and 31*b* of the mounting base 21 and the support plate 30 is passed through the through hole 40*d* of the inflator 40 and the nut 43 is fastened to each bolt 42*b*. In this way, the airbag 45, the support plate 30, and the inflator 40 can be attached to the mounting base 21. Next, in a state where the airbag 45 is covered with the pad 50, each locking leg portion 57 at the lower end of the side wall portion 56 is inserted and locked into the locking hole 22*c* of the mounting base 21 and the lower end surface 56*a* of the side wall portion 56 abuts on the upper surface 22*d* of the mounting plate portion 22. In this way, the pad 50 is connected to the mounting base 21 to complete the assembly of the airbag device 20.

In addition, in a state where the horn switch body 61 is attached to each step portion 34, when the nut 43 is fastened to each bolt 42*b* of the retainer 42 and the support plate 30 is attached to the mounting base 21, the case 62 of each horn switch body 61 is actively interposed between the lower surface 23*a* of the support seat 23, which is provided with the spacer 26 formed of the protrusion portion 27, and the upper surface 35*a* of the step portion 34, so as not to generate rattling.

Regarding the installation of the airbag device 20 on a vehicle, when the locking protrusion 71*d* of the assembling pin 71 of each horn switch body 61 is inserted into the assembling hole 11 of each assembling portion 10 of the steering wheel main body 1 already assembled to the steering shaft SS and the locking pin 12 is fitted into the locking groove 71*c*, the airbag device 20 can be attached to the steering wheel main body 1 and assembling of the steering wheel W is completed, and further the steering wheel W can be mounted on the vehicle together with the airbag device 20.

When attaching the airbag device 20 to the steering wheel main body 1, a lead wire (not illustrated) of the support plate 30 is connected to the positive electrode side of the horn operation circuit and a lead wire (not illustrated) for inputting an operation signal is connected to the inflator 40.

When the operation signal is input to the inflator 40 after being mounted on the vehicle, the inflator 40 discharges the inflation gas from the gas discharge port 40*b*, so that the folded airbag 45 allows the inflation gas to flow and expands. Then, the door portion 52 of the ceiling wall portion 51 of the pad 50 is pushed open and the airbag 45 protrudes from the opened opening of the door portion 52 and develops and expands so as to cover the upper surface of the ring portion R from above the boss portion B (see the two-dot chain line in FIG. 1).

In addition, during normal use when the inflator 40 is not operating, when the pad 50 of the airbag device 20 is pressed to operate the horn switch mechanism 60, the support seat 23 of the mounting base 21 which abuts on the lower end surface 56*a* of the side wall portion 56 descends. Further, the case 62, where the lower surface 23*a* of the support seat 23 is in contact, descends with the support seat 23 of the mounting base 21 and the mounting seat 35 of the support plate 30 and the movable-side contact point 68 disposed on the lower surface of the upper portion 64 of the case 62 also descends. In this case, the assembling pin 71 is fixed to the assembling portion 10 of the steering wheel main body 1 and the fixed-side contact point 69 formed of the upper end head portion 71*a* does not change the height position. Therefore, the case 62 provided with the movable-side contact point 68 compresses the coil spring 73, descends, and brings the movable-side contact point 68 into contact with the fixed-side contact point 69 to activate the horn. After activating the horn, when the hand is released from the pad 50, by the biasing force of the spring 73, until the lower portion 65 of the lower surface 66 side of the case 62 is regulated by the head portion 71*a* on the upper end side of the assembling pin 71, the airbag device 20, including the support plate 30, the mounting base 21, and the case 62 of the horn switch body 61, is pushed upward. Next, the contacted movable-side contact point 68 is separated from the fixed-side contact point 69 and returned to the position before the operation.

In the airbag device 20 of the embodiment, by the spacer 26 formed of the protrusion portion 27 capable of preventing rattling, the rattling against the switch disposition portion (the lower surface 23*a* of the support seat 23 and the upper surface 35*a* of the step portion 34) in the case 62 is prevented. As a result, the generation of abnormal noise is prevented. Such a prevention structure can be achieved by simply disposing the spacer 26 on the case 62 around the assembling pin 71 of the horn switch body 61 or on (in the embodiment, the mounting base 21) the mounting base 21 or the support plate 30 of the switch disposition portion. Therefore, the configuration can be simplified.

Therefore, in the airbag device 20 of the embodiment, with a simple configuration, it is possible to prevent interference of the horn switch body 61 with the surroundings of the case 62 that would generate abnormal noise.

In the embodiment, the mounting portion 21 is provided with the protrusion portion 27 as the spacer 26. However, the spacers may be provided in another support plate 30 or case 62, or in any two of the mounting base 21, the support plate 30, and the case 62. Needless to say, the spacers may be provided in all of the mounting base 21, the support plate 30, and the case 62.

In the embodiment, in the case 62, the support seat 23 as the switch disposition portion of the mounting base 21, or the step portion 34 as the switch disposition portion of the support plate 30, the spacer 26 is provided integrally with the surrounding general part 28 so as to protrude therefrom.

Therefore, in the embodiment, since the spacer does not need to be separately attached to the case 62 or the mounting base 21 or the support plate 30 of the switch disposition portion, the spacer can be easily arranged.

In the embodiment, the mounting base 21 is integrally provided with the spacer 26 from the surrounding general part 28. However, the spacer may be provided integrally with the surrounding part on the upper surface 35*a* side of the step portion 34 of the support plate 30 or the spacer may be provided integrally with the surrounding part on the upper surface 63 side or the lower surface 66 side of the case 62.

Needless to say, when the above points are not considered, a separate spacer, for example, a spacer consisting of a piece of rubber or felt, may be arranged to the lower surface 23*a* of the support seat 23 of the mounting base 21, the upper surface 35*a* of the step portion 34 of the support plate 30, or the upper surface 63 side or the lower surface 66 side of the case 62 by attaching it or the like.

However, when the spacer is provided integrally with the surrounding part, it is desirable that the spacer is provided on one of the mounting base 21 and the support plate 30.

That is, when the spacer is integrally formed in the synthetic resin case 62, it is necessary to provide a molding concave portion for forming a spacer in the molding die of the synthetic resin member where the spacer is to be provided and it is difficult to form the spacer in the case 62 itself by post-processing. However, the mounting base 21 and the support plate 30 are made of sheet metal. Further, the spacer 26 can be easily formed by post-processing, such as by pressing or pressing with the pressing pin P, or almost simultaneously with processing from a sheet metal material. Therefore, the mounting base 21 and the support plate 30 provided with the spacer 26 can be easily formed from the product of the related art and the mounting base 21 and the support plate 30 provided with the spacer 26 can be easily obtained.

In particular, in the embodiment, the spacer 26 is provided on the mounting base 21 and a plurality (in the embodiment, four) of the protrusion portions 27 partially protruding downward from the general part 28 are provided around the assembling pin 71.

Therefore, in the embodiment, the support seat 23 of the switch disposition portion of the mounting base 21 can be formed without providing the step portion, like the step portion 34 of the switch disposition portion of the support plate 30, and can be formed on a flat portion. Thus, two or more protrusion portions 27 constituting the spacer 26 can be easily formed on a flat portion around the assembling pin 71 by post-processing such as pressing with the pressing pin P. In addition, for example, when the protrusion portions 27 as the spacer 26 are arranged at three places around the assembling pin 71, each protrusion portion 27 can be pressed and abutted against the planar upper surface 63 side of the case 62 around the assembling pin 71 with good balance. As a result, around the case 62, it is possible to stably prevent a gap with respect to the support plate 30 and the mounting base 21 of the switch disposition portion that causes abnormal noise from generating.

Figure 13:
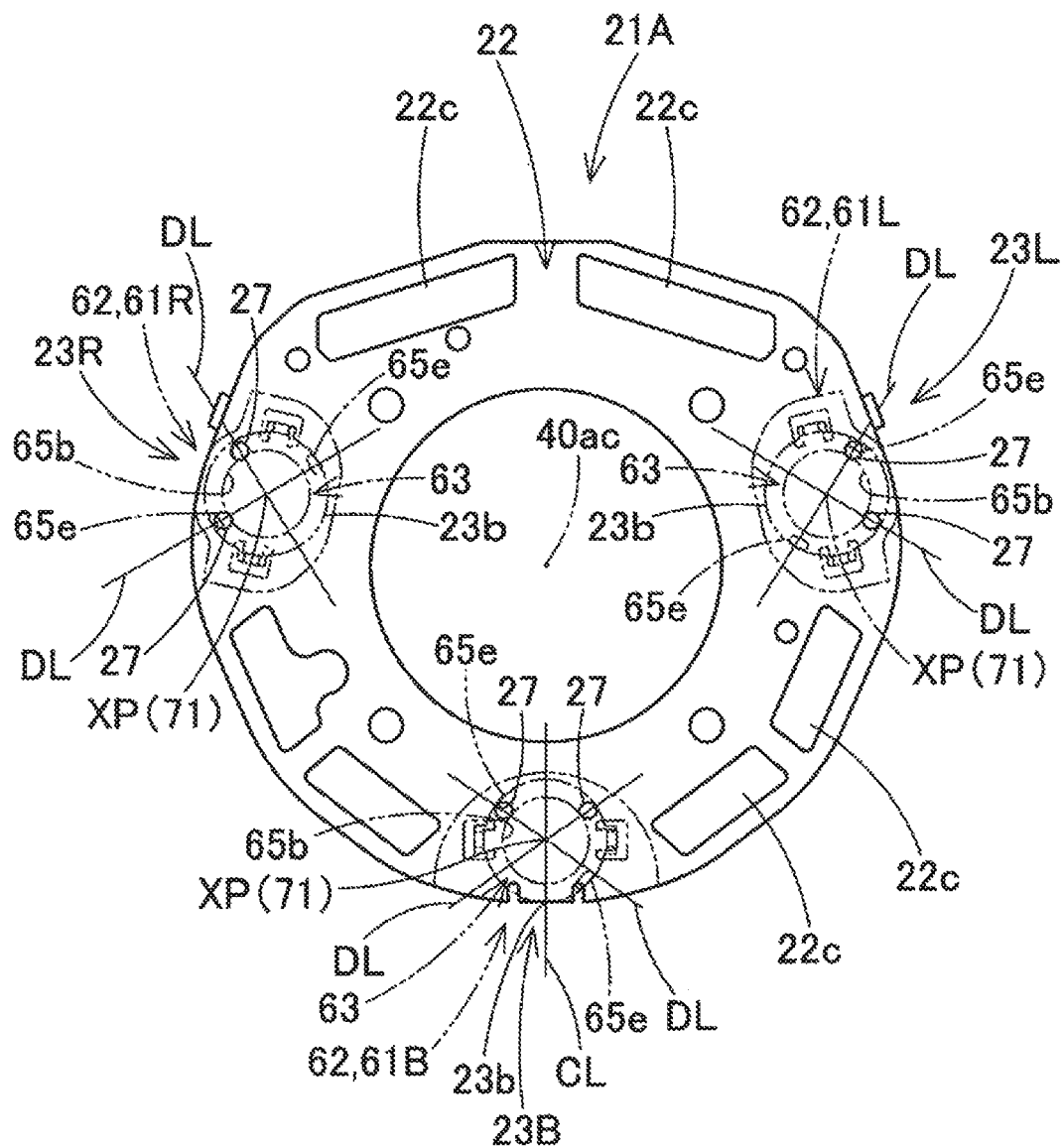
FIG. 13 is a bottom view of a modification example of the mounting base in the airbag device of the embodiment.

Needless to say, the protrusion portions 27 may be provided at two places around the assembling pin 71, as in the mounting base 21A illustrated in FIG. 13. Even in that case, each of the two protrusion portions 27 and 27 or three places of the two protrusion portions 27 in the switch disposition portion (support seat) 23 of the mounting base 21 and a portion 23*b* that is approximately point-symmetrically separated from those portions about the axis XP is pressed and abutted against the upper surface 63 of the case 62. Therefore, around the case 62, a gap with respect to the support plate 30 and the mounting base 21 of the switch disposition portion that causes abnormal noise can be prevented from generating.

In particular, in the embodiment, the protrusion portions 27 are disposed at four positions that are the installation positions of the rectangular corners around the assembling pin 71 and each protrusion portion 27 abuts on the upper surface 63 side of the case 62 around the assembling pin 71 in a more balanced manner. As a result, more stably, there is no gap around the case 62 that generates abnormal noise.

Furthermore, when arranging the protrusion portions 27 in four places around the assembling pin 71, in the embodiment, like the support seat 23B on the rear side of the mounting base 21 which is the center in the left-right direction of the airbag device 20, each protrusion portion 27 may be arranged at a left-right symmetrical position around the assembling pin 71 (see FIG. 9).

In such a configuration, in the horn switch body 61B disposed at the center portion of the airbag device 20 in the left-right direction, if the protrusion portions 27 are arranged at four left-right symmetric positions around the assembling pin 71, when pressing down the left edge or right edge side of the airbag device 20 (pad 50), in order to make the horn strokes HS of both operations equal, the left and right distances around the assembling pin 71 on the upper surface 63 side of the case 62 of the horn switch body 61B are set to be equal and each protrusion portion 27 can be pressed and abutted against the upper surface 63 side of the case 62. Therefore, evenly, the movable-side contact point 68 can be brought closer to the fixed-side contact point 69.

When arranging the protrusion portions 27 in four places around the assembling pin 71, in the embodiment, like the support seats 23L and 23R on the left and right of the mounting base 21 of the airbag device 20, each protrusion portion 27 is provided around the assembling pin 71, and is provided at the arrangement position of the square corner (see FIG. 9).

In such a configuration, around the assembling pin 71, assuming that the circumferential separation distance around the assembling pin 71 on the upper surface 63 side of the case 62 of the horn switch body 61 is equivalent, each protrusion portion 27 can be pressed and abutted against the upper surface 63 side of the case 62. Therefore, evenly, the movable-side contact point 68 can be brought closer to the fixed-side contact point 79.

In addition, when the protrusion portions 27 provided on the support seat 23 (L, R) of the switch disposition portion of the mounting base 21 are arranged in four places around the assembling pin 71, in the embodiment, the case 62 of the horn switch body 61 protrudes the positioning protrusion 65e fitted on the positioning hole 36 in the step portion 34 of the switch disposition portion of the support plate 30, on the lower surface side of the point-symmetric position around the assembling pin 71, and each protrusion portion 27 is arranged at the installation position of the square corner around the center XP of the assembling pin 71, and further it is arranged so that two of the four protrusion portions 27 are aligned on the diametrical straight line DL centered on the assembling pin 71 connecting the two positioning protrusions 65e with the center XP.

Therefore, in the support seat 23 (L. R) of the embodiment, two positioning protrusions 65e and two protrusion portions 27 are arranged on the diametrical straight line DL centered on the assembling pin 71, and with the assembling pin 71 as the center XP, two positioning protrusions 65e and four protrusion portions 27 are mutually concentrically arranged. In other words, for the fixed-side contact point 69 of the contact portion 70 formed of the upper end side of the assembling pin 71, four protrusion portions 27 are arranged concentrically, and with the positioning protrusion 65e interposed, the movable-side contact point 68 of the contact portion 70 on the upper surface 63 side of the case 62 also has a constant circumferential installation position with respect to the assembling pin 71. For this reason, the installation position of each of the four protrusion portions 27 surrounding the contact portion 70 of the horn switch body 61 with the assembling pin 71 as the center XP is in a constant arrangement state (concentric radial installation arrangement around the assembling pin 71). Therefore, the abutment state between the upper surface 63 side of the case 62 for each horn switch body 61 and each protrusion portion 27 at the time of the horn operation can be further stabilized.

Therefore, as the mounting base 21 provided with the support seats 23L and 23R illustrated in FIG. 9, regarding the configuration of the support seat 23B, as shown in parentheses in FIG. 9, when it is changed to the mounting base 21B which is configured such that each protrusion portion 27 is arranged around the center XP of the assembling pin 71 at the installation position of the square corner and two of the four protrusion portions 27 are aligned on the diametrical straight line DL centered on the assembling pin 71 connecting the two positioning protrusions 65e with the center XP, in the airbag device 20 using the mounting base 21B, in a plurality (all) of horn switch bodies 61L, 61R, and 61B provided in each support seat 23 (L, R, B), the above configuration (the installation position of each of the four protrusion portions 27 surrounding the contact portion 70 of the horn switch body 61 with the assembling pin 71 as the center XP is in a constant arrangement state (radial concentric arrangement around the assembling pin 71)) can be set. As a result, the feeling during horn operation can be improved.

Figure 14:
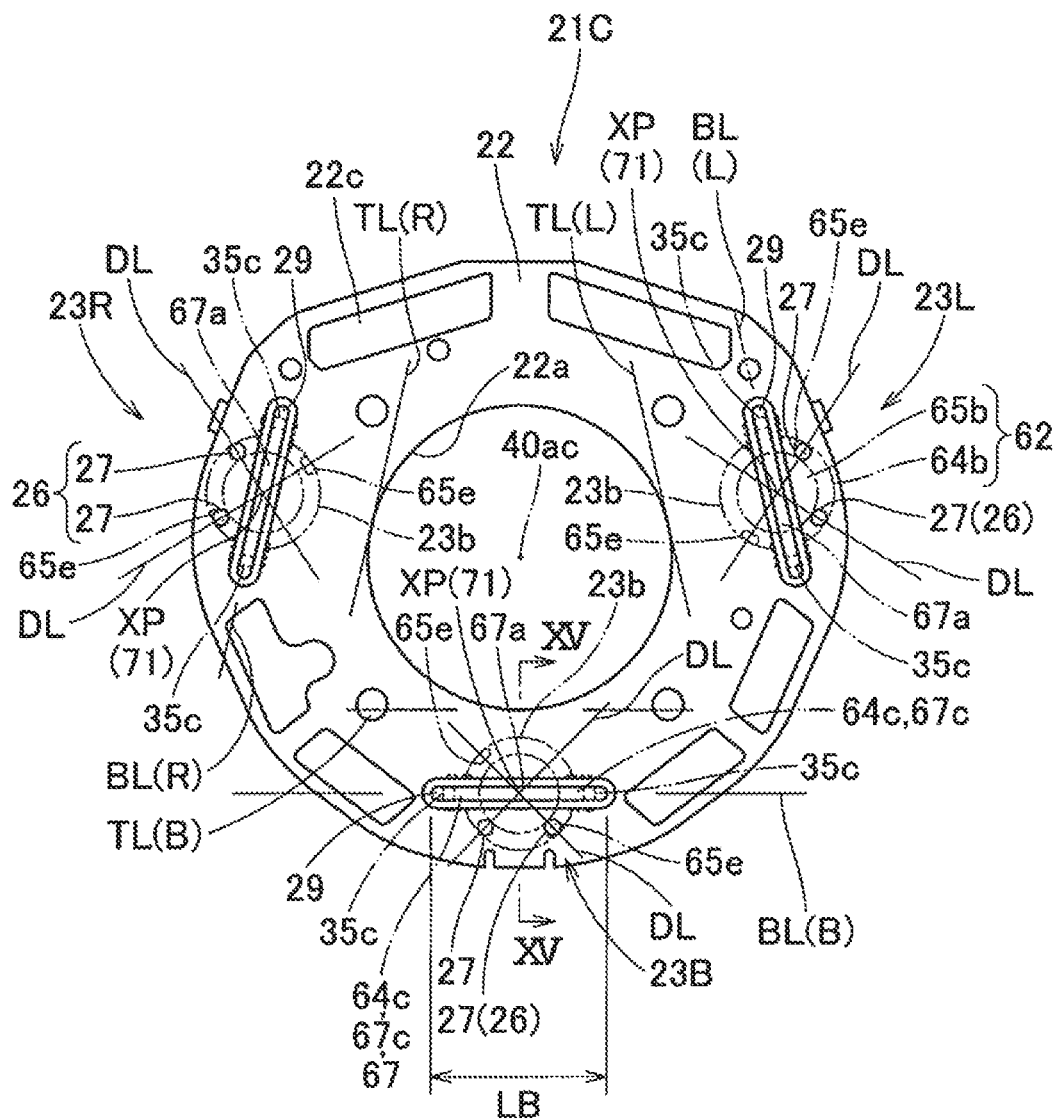
FIG. 14 is a bottom view of another modification example of the mounting base in the airbag device of the embodiment.
Figure 15:
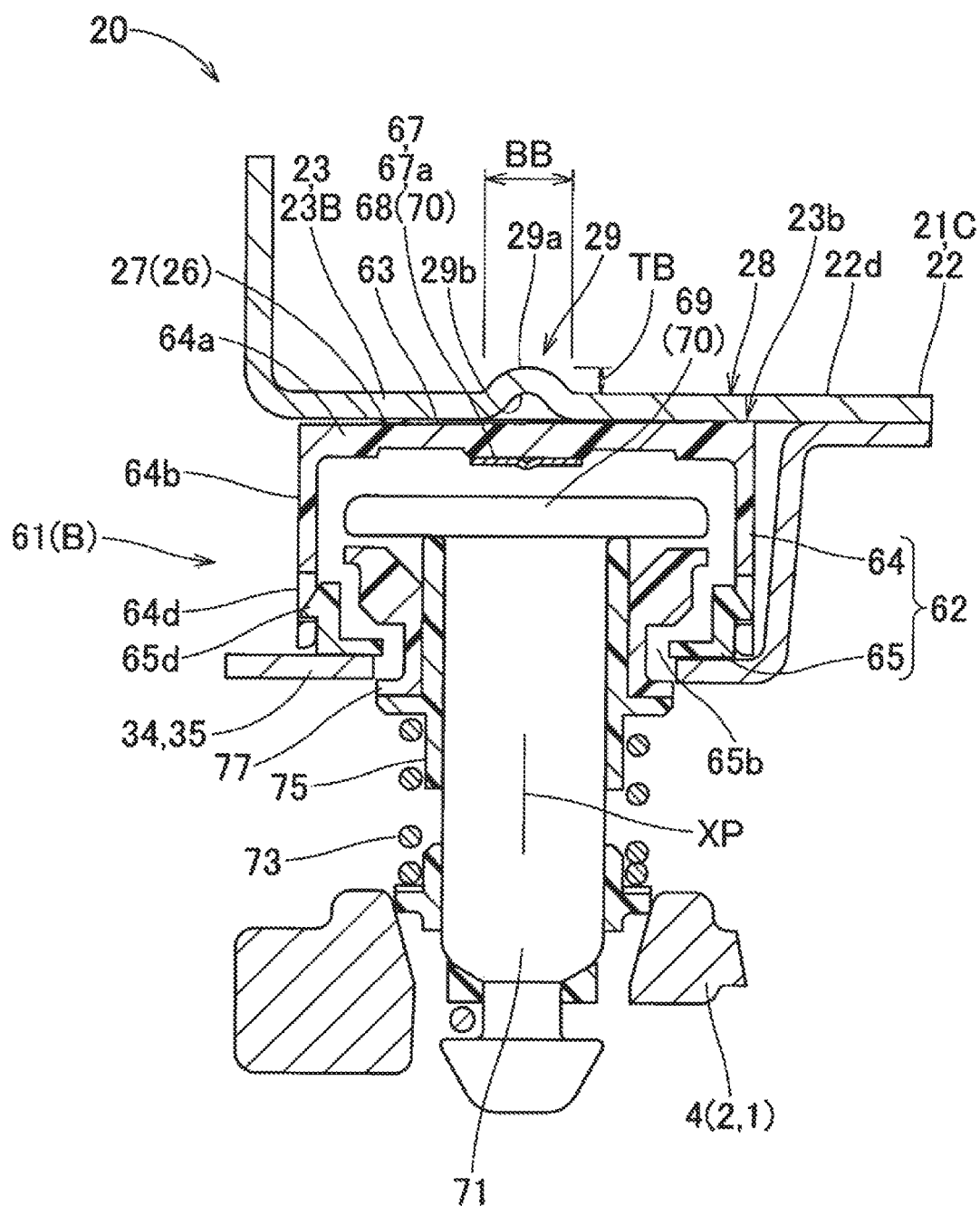
FIG. 15 is a schematic longitudinal cross-sectional view of a steering wheel equipped with the airbag device using the mounting base illustrated in FIG. 14 and corresponds to a XV-XV part in FIG. 14.

When the protrusion portion as a spacer is provided on the mounting base, as illustrated in the mounting base 21C shown in FIGS. 14 and 15, a bead 29 which partially rises upward from the upper surface 22d side on the opposite side of the protrusion portion 27 from the general part 28 and that is linearly arranged so as to cross each of the support seats 23 (L, R, B) as the switch installation portion while avoiding the protrusion portion 27. Each bead 29 is on a straight line B (L, R, B) in the direction along a tangent line TL (L, R. B) of the periphery of the insertion hole 22a near the respective support seats 23 (L, R, B) and on the diametrical line DL centered on the assembling pin 71 with the center XP.

The bead 29 in the illustrated example is formed by shaping the outer shape of the mounting base 21C and then performing post-processing such as pressing or pressing with a pressing jig, similarly to the protrusion portion 27. The bead 29 is formed so as to protrude toward the upper surface 22d side while providing a concave surface 29b on the lower surface 23a side of the mounting plate portion 22.

In the illustrated bead 29, a height dimension TB from the general part 28 to the top portion 29a protruding is about 1.5 mm, a width dimension BB is about 5 mm, and a length dimension LB is about 40 mm.

Also, in the mounting base 21C, in support seat 23 (L, R, B) as each switch disposition portion, at the installation position of the two corners arranged on the outer edge side of the mounting plate portion 22 in the corner of the square with the assembling pin 71 as the center XP, the protrusion portion 27 is arranged and these two protrusion portions 27 are disposed along the straight line BL on which the bead 29 is disposed.

Further, two protrusion portions 27 of each support seat 23 (L, R. B) are radially arranged concentrically with the bead 29 therebetween, with reference to a center (center of the inflator 40) 40ac of the insertion hole 22a. Furthermore, at least one of the two protrusion portions 27 of each support seat 23 is disposed above the installation position of the positioning protrusion 65e.

In the airbag device 20 using this mounting base 21C, the support seat 23 (L, R, B) as a switch disposition portion in the mounting base 21C can increase the rigidity by the bead 29 and suppress the bending deformation near the protrusion portion 27. Thus, each protrusion portion 27 can be stably pressed and abutted against the planar upper surface 63 side of the case 62 around the assembling pin 71. Therefore, around the case 62, it is possible to further prevent a gap of the switch disposition portion with respect to the support plate 30 or the mounting base 21B, which would cause abnormal noise, from generating.

In each support seat 23 (L, R, B) of the mounting base 21C, the two protrusion portions 27 and 27 or three places of the two protrusion portions 27 in the switch disposition portion (support seat) 23 of the mounting base 21C and the portion 23b that is approximately point-symmetrically separated from those portions about the axis XP is pressed and abutted against the upper surface 63 side of the case 62. Therefore, around the case 62, a gap with respect to the support plate 30 and the mounting base 21 of the switch disposition portion that causes abnormal noise can be prevented from generating.

Furthermore, each bead 29 is on the straight line BL (L, R, B) in the direction substantially along the tangent TL (L, R, B) of the periphery of the insertion hole 22a in the vicinity of the support seat 23 (L, R, B) as the respective switch disposition portions and is arranged on the diametrical line DL with the assembling pin 71 as the center XP.

For this reason, each bead 29 is disposed on the straight line BL (L, Rr, B) substantially along the tangent TL (L, R, B) of the periphery of the insertion hole 22a of the mounting base 21C in the vicinity of each support seat 23 (L, R, B). Therefore, even when the bead 29 is arranged in a straight line shape with a long dimension, the insertion hole 22a hardly interferes with the mounting seat 22e of the mounting base 21B for attaching the inflator 40 and the airbag 45 around the edge, and thus the bead 29 can be smoothly disposed.

In addition, in each support seat 23 (L, R, B) of the mounting base 21C in the drawing, actually, the abutment portions of the case 62 to the upper surface 63 are three portions of the protrusion portions 27 and 27 on both sides with the bead 29 therebetween and the above-described portion 23b and are almost equally separated from the bead 29. Therefore, it is stably pressed and abutted against the case 62.

What is claimed is:

1. An airbag device with a horn switch body which is configured so as to be installed in an upper surface side in a boss portion near a center of a steering wheel, the airbag device comprising:
    an airbag which inflates by receiving inflation gas;
    an inflator for supplying the inflation gas to the airbag;
    a pad covering the folded airbag;
    a mounting base made of sheet metal which holds the airbag, the inflator, and the pad;
    a horn switch body having an assembling pin to be assembled to a main body side of the steering wheel; and
    a support plate made of a sheet metal which supports the horn switch body as a configuration attached to a lower surface side of the mounting base, wherein:
    the mounting base and the support plate have an insertion hole for inserting a main body portion for discharging the inflation gas in the inflator;
    a plurality of mutually opposed parts around the insertion hole are respectively set as switch disposition portions which allow a synthetic resin case surrounding top, bottom, and sides of a contact portion of the horn switch body to be disposed between the mounting base and the support plate;
    the support plate disposes the switch disposition portion from a lower surface side of the switch disposition portion of the mounting base to a step portion which is recessed by an approximate height of the case, so the case is arranged between an upper surface side of the step portion and a lower surface side of the switch disposition portion in the mounting base;
    the horn switch body protrudes a lower end side of the assembling pin from inside the case through the support plate and assembles it to a main body side of the steering wheel and places a movable-side contact point of the contact portion on a lower surface side of a ceiling wall portion of the case in the case and places a fixed-side contact point of the contact portion on an upper end side of the assembling pin provided in the case;
    an upward movement of the case is regulated by an upper end side of the assembling pin and a spring is arranged between a lower surface side of the case and a lower end side of the assembling pin to bias the case and the lower end side of the assembling pin in a direction to separate them; and
    the case around the assembling pin of the horn switch body, the mounting base of the switch disposition portion, or the support plate is provided with a spacer capable of preventing rattling of the switch disposition portion in the case, wherein
    the spacer is provided in one of the case, the switch disposition portion of the mounting base, or the switch disposition portion of the support plate, integrally with a surrounding general part, protruding from the general part, wherein
    the spacer is disposed on one of the mounting base or the support plate, wherein:
    the spacer is provided on the mounting base; and
    a plurality of protrusion portions which protrude partially downward from the general part are provided around the assembling pin, and
    the protrusion portion is disposed at four positions, which are arrangement positions of rectangular corners around the assembling pin.

2. The airbag device with the horn switch body according to claim 1, wherein
    the protrusion portions are disposed in lateral symmetric positions around the assembling pin.

3. The airbag device with the horn switch body according to claim 1, wherein
    the protrusion portions are disposed in installation positions of square corners around the assembling pin.

4. The airbag device with the horn switch body according to claim 3, wherein:
    the case of the horn switch body has a positioning protrusion, which is fitted into a positioning hole of the switch disposition portion of the support plate, protruding from a lower surface side of a point-symmetric position around the assembling pin; and
    the protrusion portion is arranged around the assembling pin at the installation position of the square corner and two of the four protrusion portions are disposed so as to coincide with a diametrical line centered on the assembling pin connecting the two positioning protrusions.

5. The airbag device with the horn switch body according to claim 1, wherein
    the mounting base is provided with a bead which partially protrudes upward from the general part and is arranged linearly so as to traverse the switch disposition portion while avoiding the protrusion portion.

6. The airbag device with the horn switch body according to claim 5, wherein
    a bead is disposed on a straight line in a direction substantially along a tangent to a periphery of the insertion hole near each of the switch disposition portions and on a diametric line centered on the assembling pin.

* * * * *